United States Patent
Nakata et al.

(10) Patent No.: US 9,751,393 B2
(45) Date of Patent: Sep. 5, 2017

(54) SADDLE TYPE VEHICLE

(71) Applicant: HONDA MOTOR CO., LTD., Tokyo (JP)

(72) Inventors: Masato Nakata, Wako (JP); Satoshi Seo, Wako (JP); Tetsuya Tanabe, Wako (JP); Kota Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 14/474,969

(22) Filed: Sep. 2, 2014

(65) Prior Publication Data

US 2015/0068830 A1 Mar. 12, 2015

(30) Foreign Application Priority Data

Sep. 11, 2013 (JP) .................. 2013-188825

(51) Int. Cl.
| | | |
|---|---|---|
| *B62K 11/00* | (2006.01) | |
| *B60K 11/04* | (2006.01) | |
| *B62K 11/04* | (2006.01) | |
| *B60K 13/04* | (2006.01) | |
| *F28F 9/00* | (2006.01) | |

(52) U.S. Cl.
CPC ............. *B60K 11/04* (2013.01); *B60K 13/04* (2013.01); *B62K 11/04* (2013.01); *F28F 9/001* (2013.01)

(58) Field of Classification Search
CPC .................................................... B60K 11/04
USPC ........................................................ 180/229
See application file for complete search history.

(56) References Cited

U.S. PATENT DOCUMENTS

| | | | | | |
|---|---|---|---|---|---|
| 4,428,451 | A | * | 1/1984 | Yamaoka | F01P 3/18 123/65 EM |
| 4,478,306 | A | * | 10/1984 | Tagami | B60K 11/04 165/41 |
| 4,632,206 | A | * | 12/1986 | Morinaka | B62J 17/02 165/41 |
| 5,176,111 | A | * | 1/1993 | Nakamura | B62K 11/00 123/41.01 |
| 5,269,243 | A | * | 12/1993 | Mochizuki | F02B 61/02 123/305 |
| 5,301,767 | A | * | 4/1994 | Shiohara | B60K 13/06 180/219 |
| 5,577,570 | A | * | 11/1996 | Shiohara | B62J 17/00 180/219 |
| 5,715,778 | A | * | 2/1998 | Hasumi | B60K 11/04 123/196 AB |

(Continued)

FOREIGN PATENT DOCUMENTS

JP  06-069092 U  9/1994

*Primary Examiner* — Joseph Rocca
*Assistant Examiner* — Conan Duda
(74) *Attorney, Agent, or Firm* — Squire Patton Boggs (US) LLP

(57) ABSTRACT

Left and right radiators in a saddle type vehicle are formed in a trapezoidal shape and disposed such that a shorter one of two side portions of each of the radiators which extend in parallel or substantially in parallel to each other as viewed in front elevation is positioned at the inner side in the vehicle widthwise direction. A longer one of the side portions is disposed at the outer side in the vehicle widthwise direction. Forward projections of an exhaust pipe projecting forwardly from an engine pass below the shorter side portions at the inner side in the vehicle widthwise direction of the radiators.

19 Claims, 12 Drawing Sheets

(56) References Cited

U.S. PATENT DOCUMENTS

| | | | | |
|---|---|---|---|---|
| 5,992,554 A * | 11/1999 | Hasumi | B60K 11/04 123/41.51 |
| 6,332,505 B1 * | 12/2001 | Tateshima | B62K 11/00 180/229 |
| 6,619,415 B1 * | 9/2003 | Hasumi | B62J 17/02 180/68.1 |
| 6,695,089 B2 * | 2/2004 | Adachi | B62K 11/04 180/219 |
| 7,358,003 B2 * | 4/2008 | Imaseki | H01M 8/04029 180/229 |
| 7,389,584 B2 * | 6/2008 | Ringholz | F28D 1/047 165/173 |
| 7,556,115 B2 * | 7/2009 | Iwanaga | B62J 99/00 180/219 |
| 2002/0029912 A1 * | 3/2002 | MacKelvie | B60K 11/00 180/68.1 |
| 2002/0043415 A1 * | 4/2002 | Okuma | B62K 11/04 180/225 |
| 2003/0183433 A1 * | 10/2003 | MacKelvie | B60K 11/00 180/68.1 |
| 2004/0020449 A1 * | 2/2004 | Stevens | F04D 29/582 123/41.49 |
| 2008/0099261 A1 * | 5/2008 | Sturmon | B60K 11/08 180/68.1 |
| 2008/0236783 A1 * | 10/2008 | Morita | B60K 11/04 165/41 |
| 2009/0095553 A1 * | 4/2009 | Iwanaga | B60K 11/04 180/229 |
| 2010/0018793 A1 * | 1/2010 | Arnold | B62K 19/30 180/229 |
| 2010/0078242 A1 * | 4/2010 | Suzuki | B60K 11/04 180/68.6 |
| 2010/0187033 A1 * | 7/2010 | Hayashi | B60K 11/04 180/68.4 |
| 2011/0114044 A1 * | 5/2011 | Dees | F02F 1/40 123/41.82 R |
| 2013/0118721 A1 * | 5/2013 | Inoue | F01P 3/18 165/148 |
| 2013/0118822 A1 * | 5/2013 | Toda | B60K 11/04 180/68.4 |
| 2013/0146377 A1 * | 6/2013 | Adamson | B60K 11/06 180/68.1 |
| 2014/0151139 A1 * | 6/2014 | Rizzon | B60K 11/08 180/68.1 |
| 2014/0209405 A1 * | 7/2014 | Nakamura | B60K 11/04 180/309 |
| 2015/0014079 A1 * | 1/2015 | Takasaki | B62K 11/04 180/229 |
| 2015/0014080 A1 * | 1/2015 | Takasaki | B62J 15/00 180/229 |
| 2015/0083513 A1 * | 3/2015 | Ito | B60K 13/02 180/229 |
| 2015/0107923 A1 * | 4/2015 | Inayama | B60K 11/04 180/229 |
| 2015/0306934 A1 * | 10/2015 | Oono | B60K 11/04 165/104.14 |
| 2016/0090152 A1 * | 3/2016 | Sasaki | B62M 7/04 180/229 |
| 2016/0144921 A1 * | 5/2016 | Oshima | B62J 15/00 180/229 |
| 2016/0229283 A1 * | 8/2016 | Laroche | B62D 25/085 |
| 2016/0244116 A1 * | 8/2016 | Komatsu | B62J 23/00 |
| 2016/0264201 A1 * | 9/2016 | Inomata | B62J 37/00 |
| 2016/0280059 A1 * | 9/2016 | Hagimoto | B60K 11/04 |

\* cited by examiner

SADDLE TYPE VEHICLE

BACKGROUND

Field:

The present invention relates to a saddle type vehicle.

Description of the Related Art:

A motorcycle is known wherein a vehicle body frame includes a single down frame extending downwardly from a head pipe and a pair of left and right radiators are attached to the down frame (refer, for example, to Japanese Utility Model Laid-Open No. Hei 6-69092 (Patent Document 1)).

In a saddle type vehicle such as a motorcycle which includes a large displacement engine, it is demanded to assure a great capacity for a radiator in order to assure a high cooling effect of the radiator.

However, in a large displacement engine configured such that an exhaust pipe extends forwardly from the engine, if a pair of left and right radiators are attached to a down frame as in the configuration of the Patent Document 1, then the dimension of the radiators is sometimes restricted by the exhaust pipe. This makes it difficult to assure a sufficient capacity for the radiators, resulting in insufficient cooling effect of the radiators.

SUMMARY

Therefore, it is an object of the present invention to provide a saddle type vehicle wherein a radiator is attached to a down frame and, even if some member around the radiator restricts the size of the radiator, a favorable capacity can be assured for the radiator to raise the cooling effect of the radiator.

As means for solving the problem described above, embodiments of a saddle type vehicle can include a pair of left and right main frames extending rearwardly from a head pipe, and a down frame extending downwardly from the head pipe. An engine is disposed below the main frames in the rear of the down frame. A pair of left and right radiators are attached to the down frame. An exhaust pipe is connected to the engine and includes a pair of left and right forward projections extending forwardly from the engine, passing the left and right of the down frame and curved downwardly. At least one of the left and right radiators is formed in a trapezoidal shape, and that one of the radiators which is formed in the trapezoidal shape is disposed in a state in which, as viewed in front elevation, a shorter one of two side portions extending in parallel or substantially in parallel to each other is positioned at the inner side in the vehicle widthwise direction. A longer one of the side portions is disposed at the outer side in the vehicle widthwise direction. The forward projection positioned at the same side as the radiator formed in the trapezoidal shape is placed in a state in which the forward projection passes below the shorter side portion at the inner side in the vehicle widthwise direction of the radiator formed in the trapezoidal shape.

According to certain embodiments of the invention, the saddle type vehicle is configured such that a lower end of the radiator is positioned higher than a front face upper end of a crankcase of the engine.

According to certain embodiments of the invention, the saddle type vehicle is configured such that the left and right radiators are formed in a trapezoidal shape. Each of the left and right radiators includes a radiator main body having a plurality of water pipes and a plurality of fins and a radiator grill disposed in front of the radiator main body. The radiator main bodies and the radiator grills are formed in a plate-like shape and integrated in a state in which the radiator main bodies and the radiator grills extend along each other. The radiator main bodies and the radiator grills are disposed in a state in which the radiator main bodies and the radiator grills extend to the outer sides in the vehicle widthwise direction as the radiator main bodies, and the radiator grills extend forwardly as viewed in top plan.

According to certain embodiments of the invention, the saddle type vehicle is configured such that the radiator main bodies are configured such that the water pipes are disposed in a juxtaposed relationship in the vehicle widthwise direction in a state in which the water pipes extend in an upward and downward direction. Also the water pipes are formed longer toward the outer sides in the vehicle widthwise direction. Each of the radiator main bodies includes an upper tank to which a hose for passing cooling water therethrough is connected and which is communicated with upper ends of the water pipes and a lower tank to which a hose for passing cooling water therethrough is connected and which is communicated with lower ends of the water pipes. The cooling water which enters the upper tanks enter the lower tanks through the water pipes. The upper tanks and the lower tanks are configured such that the height thereof in the upward and downward direction and the capacity of a portion thereof at the outer side in the vehicle widthwise direction are set higher and greater than those of a portion thereof at the inner side in the vehicle widthwise direction.

According to certain embodiments of the invention, the saddle type vehicle is configured such that each of the left and right radiators includes a radiator shroud disposed in the rear of the radiator main body. The radiator shroud has a first opening provided at one end portion thereof and is integrated with the radiator main body by fitting the first opening with a first projection provided on the radiator main body, and fitting a first fastening member to the other end portion of the radiator shroud at the opposite side to the one end portion to fasten the radiator shroud to the radiator main body.

According to certain embodiments of the invention, the saddle type vehicle is configured such that each of the radiator grills has a second opening provided at one end portion thereof and a third projection provided at the other end portion thereof at the opposite side of the one end portion, and is integrated with the radiator main body by inserting a second projection provided on the radiator main body into the second opening and inserting the third projection into a third opening formed on the radiator main body.

According to certain embodiments of the invention, the saddle type vehicle is configured such that each of the radiator grills has a second opening provided at one end portion thereof and a third projection provided at the other end portion thereof at the opposite side to the one end portion, and is integrated with the radiator main body by inserting a second projection provided on the radiator main body into the second opening and inserting the third projection into a third opening formed on the radiator main body. One of the first projection and the second projection provided on the radiator main body is provided at the inner side in the vehicle widthwise direction and the other one of the first and second projections is provided at the outer side in the vehicle widthwise direction. The first opening provided at the one end portion of the radiator shroud and the second opening provided at the one end portion of the radiator grill are spaced to the inner side and the outer side in the vehicle widthwise direction.

According to certain embodiments of the invention, the saddle type vehicle is configured such that an oil cooler is attached to one of the left and right radiators, and a radiator reserve tank is attached to the other one of the left and right radiators.

According to certain embodiments of the invention, the saddle type vehicle is configured such that the radiator reserve tank has a projection inserted in an opening provided at an upper portion of the radiator grill and a fastening portion fastened to a front cowl stay disposed in front of the head pipe, and is supported on the radiator grill and the front cowl stay by inserting the projection into the opening and fastening the fastening portion to the front cowl stay.

According to certain embodiments of the invention, the saddle type vehicle is configured such that a pair of left and right reinforcing members are provided across the left and right main frames and the down frame. The reinforcing member positioned at the same side as the radiator formed in the trapezoidal shape is in a state in which the reinforcing member passes above the shorter side portion at the inner side in the vehicle widthwise direction of the radiator formed in the trapezoidal shape.

According to certain embodiments of the invention, the saddle type vehicle is configured such that upper portions of the left and right radiators are connected to each other by a radiator connection hose through which cooling water is circulated. The radiator connection hose is disposed in the rear of the down frame below the reinforcing members.

According to certain embodiments of the invention, the saddle type vehicle is configured such that a radiator feeding hose for feeding cooling water from the engine therethrough is connected to an upper portion of one of the left and right radiators. The radiator feeding hose is disposed in a state in which the radiator feeding hose overlaps with at least part of the reinforcing members as viewed in side elevation.

According to certain embodiments of the invention, the saddle type vehicle is configured such that each of the left and right radiators includes a radiator main body having a plurality of water pipes and a plurality of fins and a radiator shroud disposed in the rear of the radiator main body. A radiator fan is attached to each of the left and right radiator main bodies; the radiator fan is attached to a rather higher position in the upward and downward direction. Each of the left and right radiator shrouds covers the radiator fan from the inner side in the vehicle widthwise direction and from above and below but exposes the radiator fan from the outer side in the vehicle widthwise direction. The left radiator fan is controlled so as to rotate in a clockwise direction but the right radiator fan is controlled so as to rotate in a counterclockwise direction.

According to certain embodiments of the invention, a saddle type vehicle includes a pair of left and right main frames extending rearwardly from a head pipe, and a down frame extending downwardly from the head pipe. An engine is disposed below the main frames in the rear of the down frame, and a pair of left and right radiators are attached to the down frame. Each of the left and right radiators includes radiator main body having a plurality of water pipes and a plurality of fins, and a radiator shroud disposed in rear of the radiator main body. A radiator fan is attached to each of the left and right radiator main bodies; the radiator fan is attached to a rather higher position in the upward and downward direction. Each of the left and right radiator shrouds covers the radiator fan from the inner side in the vehicle widthwise direction and from above and below but exposes the radiator fan from the outer side in the vehicle widthwise direction. The radiator fan is controlled so as to rotate in a clockwise direction but the right radiator fan is controlled so as to rotate in a counterclockwise direction.

With certain embodiments of the invention, each of the radiators formed in a trapezoidal shape is placed in a state in which a shorter one of the two side portions thereof extending in parallel or substantially in parallel to each other is positioned at the inner side in the vehicle widthwise direction. Further, the exhaust pipe is placed in a state in which it passes below the shorter side portion. Consequently, while interference between the radiators and the exhaust pipe is prevented, the dimension of the radiators is assured in the vehicle widthwise direction and the upward and downward direction by the portions of the radiators whose dimension in the upward and downward direction gradually increases toward the outer sides in the vehicle widthwise direction from the side portions at the inner side in the vehicle widthwise direction. Therefore, the capacity of the radiators can be assured. Consequently, even if some member around the radiator restricts the size of any of the radiators, the capacity of the radiators can be assured suitably thereby to improve the cooling efficiency of the radiators.

Further, at an obliquely leftward forward position and an obliquely rightward forward position of the down frame, a pair of left and right front forks supported for pivotal motion on the head pipe are sometimes positioned in a state in which they extend obliquely downwardly toward the front from the head pipe side. However, since the front fork is disposed such that it passes, upon steering, closely above the shorter side portion of the radiators at the inner side in the vehicle widthwise direction, a layout of a high space efficiency can be achieved and compactification and improvement in degree of freedom of the layout of parts can be achieved.

With certain embodiments, traveling wind passing below the radiators directly hits the front face of the crankcase, and consequently, the cooling efficiency of the engine can be raised together with improvement of the cooling efficiency of the radiators.

With certain embodiments, the locus of rotation of a steering system supported for rotation on the head pipe can be positioned in the space between the left and right radiators to dispose the radiators in a forwardly packed state. Consequently, the space can be utilized effectively to achieve compactification of the vehicle and improvement in degree of freedom of the layout of other parts.

With certain embodiments, a large difference in the heightwise direction can be assured between the side portion at the inner side in the vehicle widthwise direction and the side portion at the outer side in the vehicle widthwise direction of the radiators. Consequently, a sufficient capacity of the radiators can be assured readily in a high space efficiency while interference between the radiators and the exhaust pipe is avoided.

Further, a large capacity is assured for a region of the upper tanks at the outer side in the vehicle widthwise direction, and from the upper tanks, much cooling water can be supplied to the water pipe, which exhibits a high cooling efficiency, formed long and rather near to the outer side of the water pipes in the vehicle widthwise direction. Therefore, the cooling efficiency can be improved. Furthermore, the upper tanks and the lower tanks are inclined downwardly and can supply cooling water smoothly to the lower side of the inside thereof, and consequently, also the circulation efficiency of cooling water can be improved.

With certain embodiments, the radiator shrouds can be integrated readily with the radiator main bodies.

With certain embodiments, the radiator grill can be integrated readily with the radiator main body.

With certain embodiments, since the insertion points of the radiator shrouds and the radiator grills into the radiator main bodies are selectively distributed to the inner side and the outer sides in the vehicle widthwise direction, erroneous assembly can be prevented. Further, if the first projection and the second projection are positioned at the same side of the radiator main body, then the formation position of them is restricted and, in some cases, the size of the radiator main body must be increased. However, where the first projection and the second projection are selectively distributed to the inner side and the outer side in the vehicle widthwise direction, the radiator main bodies can be prevented from increasing in size uselessly.

With certain embodiments, since the oil cooler and the radiator reserve tank are selectively distributed to the left and right, the balance in the leftward and rightward direction can be uniformized.

With certain embodiments, since the radiator grill, radiator reserve tank and front cowl stay are connected to each other, the rigidity of the members can be assured. Further, since liquid in the radiator reserve tank provides a vibration suppression effect, vibration generated on the radiator grill and the front cowl stay can be suppressed.

With certain embodiments, since the reinforcing member passes below the shorter side portion of the radiator at the inner side in the vehicle widthwise direction, interference between the reinforcing member and the radiator can be prevented in a high space efficiency.

With certain embodiments, since the space is effectively utilized to dispose the radiator connection hose, compactification of the vehicle and improvement in degree of freedom in layout of other parts can be achieved. Further, since the radiator connection hose becomes less conspicuous, the appearance can be improved.

With certain embodiments, since the space is effectively utilized to dispose the radiator feeding hose, compactification of the vehicle and improvement in degree of freedom in layout of other parts can be achieved. Further, since the radiator feeding hose becomes less conspicuous, the appearance can be improved.

With certain embodiments, air staying in the radiator shrouds at an upper portion side at the inner side in the vehicle widthwise direction can be removed efficiently from the lower side of the radiator fans. Therefore, the cooling performance of the radiators can be improved. More particularly, air in the radiator shrouds at the upper portion side at the inner side in the vehicle widthwise direction is likely to stay and less likely to escape to the outside by the face at the inner side in the vehicle widthwise direction (corresponding to the wall face portions 39L1 and 39R1 in the embodiment). However, where the direction of rotation of the left and right radiator fans is defined so that air may escape favorably, air staying in the radiator shrouds is removed efficiently.

With certain embodiments, air staying in the radiator shrouds at an upper portion side at the inner side in the vehicle widthwise direction can be removed efficiently from the lower side of the radiator fans. Therefore, the cooling performance of the radiators can be improved. More particularly, air in the radiator shrouds at the upper portion side at the inner side in the vehicle widthwise direction is likely to stay and less likely to escape to the outside by the face at the inner side in the vehicle widthwise direction (corresponding to the wall face portions 39L1 and 39R1 in the embodiment). However, where the direction of rotation of the left and right radiator fans is defined so that air may escape favorably, air staying in the radiator shrouds is removed efficiently.

DETAILED DESCRIPTION

Figure 1:
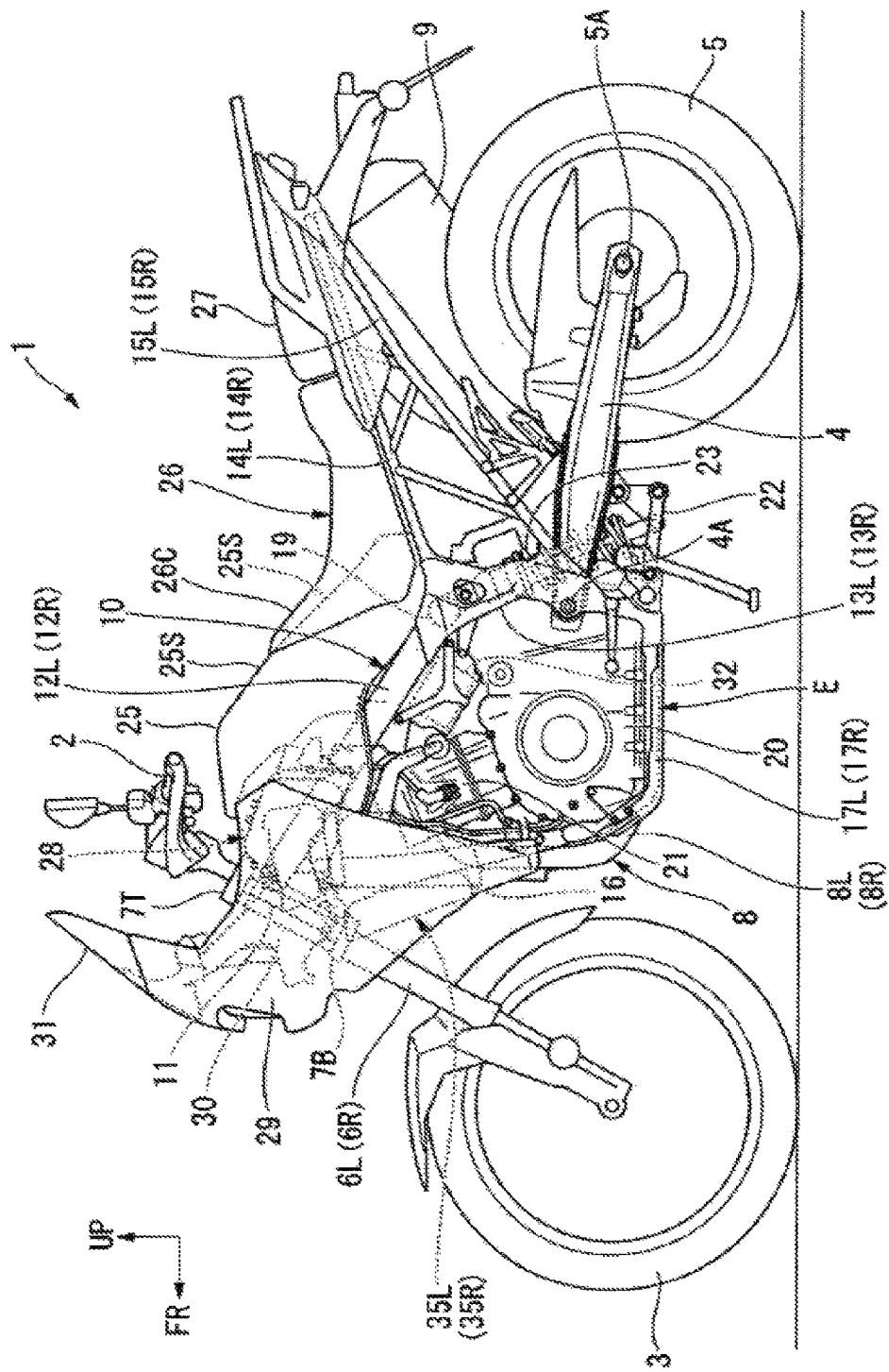
FIG. 1 is a side elevational view of a motorcycle according to embodiments of the present invention.

In the following, embodiments of the present invention is described with reference to the drawings. It is to be noted that, in the drawings referred to in the following description, an arrow mark FR indicates a forward direction of a vehicle; another arrow mark UP an upward direction of the vehicle; a further arrow mark LH a leftward direction of the vehicle; and a still further arrow mark RH a rightward direction of the vehicle.

FIG. 1 shows a left side elevational view of a motorcycle 1 as a saddle type vehicle according to certain embodiments. In the motorcycle 1, an engine E is disposed between a front wheel 3 steered by a steering handle bar 2 and a rear wheel 5 disposed at a rear end portion of a swing arm 4. Steering system parts including the steering handle bar 2 and the front wheel 3 are supported for steering movement on a head pipe 11 at a front end of a vehicle body frame 10. The swing arm 4 is rockably supported at a front end portion thereof on the vehicle body frame 10 and supports, at a rear end portion thereof, an axle 5A of the rear wheel 5.

Figure 2:
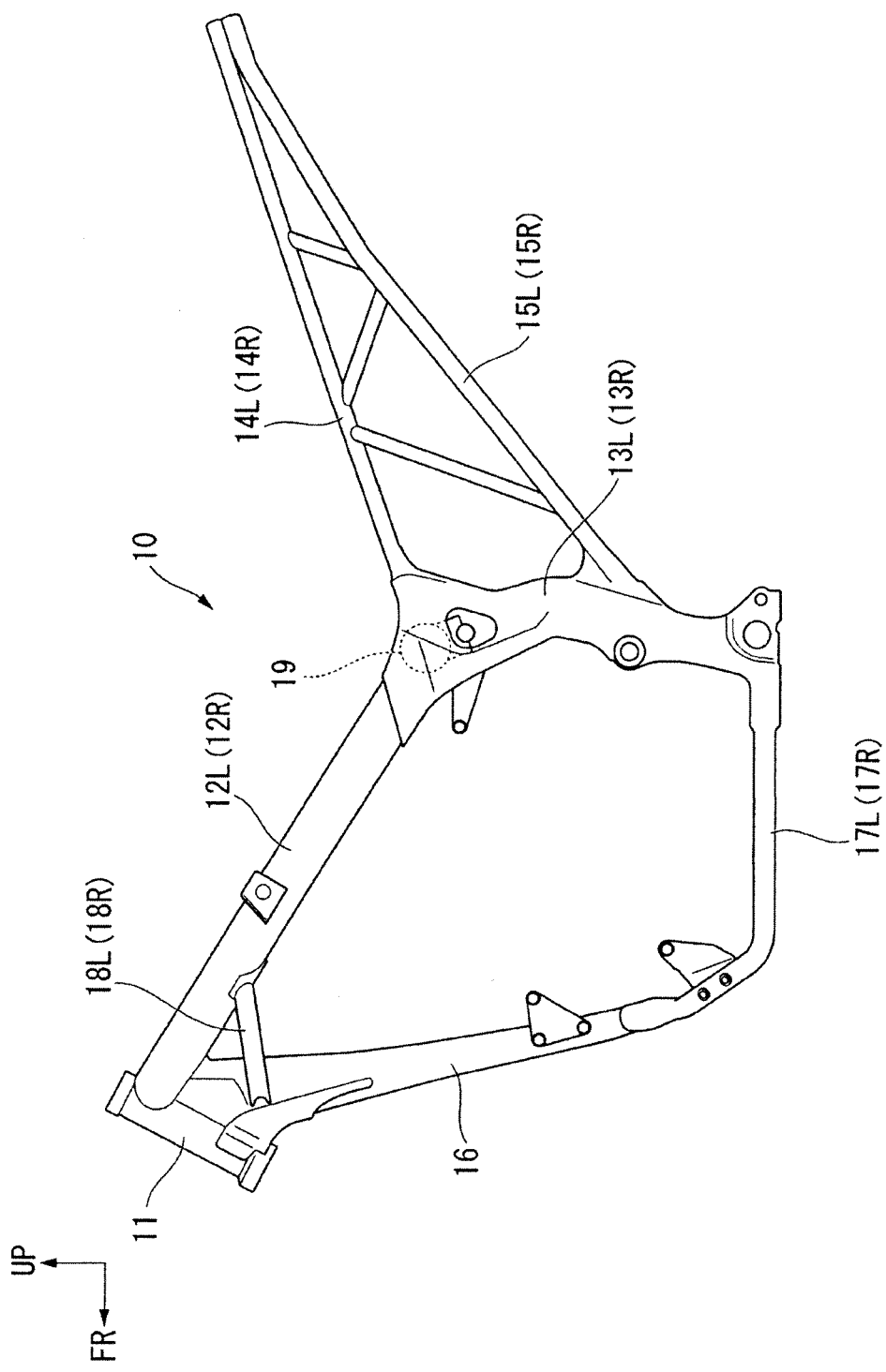
FIG. 2 is a left side elevational view of a vehicle body frame of the motorcycle.

Referring also to FIG. 2, the vehicle body frame 10 is configured from a plurality of frame members integrated with each other by welding or the like. The vehicle body frame 10 includes the head pipe 11, a pair of left and right main frames 12L and 12R, a pair of left and right pivot plates 13L and 13R, a pair of left and right seat rails 14L and 14R, and a pair of left and right sub frames 15L and 15R. The main frames 12L and 12R extend rearwardly downwardly in a leftwardly and rightwardly branched manner from the head pipe 11 to the right and left. The pivot plates 13L and 13R are connected to a rear end portion of the left and right main frames 12L and 12R, respectively, and extend downwardly. The seat rails 14L and 14R are connected to an upper portion of the pivot plates 13L and 13R, respectively, and extend rearwardly upwardly. The sub frames 15L and 15R are connected to the pivot plates 13L and 13R and extend rearwardly upwardly below the seat rails 14L and 14R, respectively, and are connected at a rear end portion thereof to the corresponding seat rails 14L and 14R, respectively.

The vehicle body frame 10 further includes a single down frame 16, and a pair of left and right lower frames 17L and 17R. The down frame 16 extends rearwardly downwardly from the head pipe 11 at a steeper angle than that of the main frames 12L and 12R. The lower frames 17L and 17R extend rearwardly in a leftwardly and rightwardly branched manner from a lower end portion of the down frame 16 and are connected at a rear end portion thereof to a lower end portion of the corresponding left and right pivot plates 13L and 13R. In the vehicle body frame 10, the main frames 12L and 12R, seat rails 14L and 14R and pivot plates 13L and 13R are connected to each other such that they form a Y shape as viewed in side elevation.

It is to be noted that, in FIGS. 1 and 2, those members which do not appear in the figures are represented by reference characters in parentheses for the convenience of illustration. Also in the succeeding figures, those members which do not appear in the figures are sometimes represented by reference characters in parentheses for the convenience of illustration.

The vehicle body frame 10 is configured as a vehicle body frame of the semi-double cradle type wherein the engine E is disposed in front of the pivot plates 13L and 13R below the main frames 12L and 12R. The vehicle body frame 10 is enclosed from the front and from below with the down frame 16 and the lower frames 17L and 17R, respectively. The engine E is supported on the vehicle body frame 10 by a plurality engine supporting portions provided at suitable locations of the vehicle body frame 10.

Further, as depicted in FIG. 2, a pair of left and right reinforcing members 18L and 18R are provided on the vehicle body frame 10 across front portions of the left and right main frames 12L and 12R and an upper portion of the down frame 16.

The reinforcing members 18L and 18R extend moderately forwardly downwardly from the main frames 12L and 12R, respectively, and extend to the inner side in the vehicle widthwise direction toward the front. Further, front end portions of the reinforcing members 18L and 18R are directed to a lower end portion of the head pipe 11.

It is to be noted that, from among the paired left and right main frames 12L and 12R, the paired left and right pivot plates 13L and 13R, the paired left and right seat rails 14L and 14R, the paired left and right sub frames 15L and 15R, the paired left and right lower frames 17L and 17R and the paired left and right reinforcing members 18L and 18R, the left side ones are disposed on the left with respect to the center in the vehicle widthwise direction and the right side ones are disposed on the right with respect to the center in the vehicle widthwise direction. Some of the paired left and right component frames are coupled to each other therebetween at a suitable place by a cross frame not depicted.

Referring back to FIG. 1, the engine E further includes a crankcase 20 in which a crankshaft and a transmission are accommodated integrally and a cylinder block 21 projecting upwardly (accurately, forwardly upwardly) from a front side of an upper face of the crankcase 20. The crankcase 20 and the cylinder block 21 are coupled to each other such that they form a V shape as viewed in side elevation.

The engine E is disposed such that the crankcase 20 and the cylinder block 21 are accommodated in a space surrounded by the main frames 12L and 12R, pivot plates 13L and 13R, down frame 16 and lower frames 17L and 17R.

The cylinder block 21 is disposed such that the direction of a cylinder axis thereof (standing direction) extends substantially along the extending direction of the down frame 16. The engine E is a parallel two-cylinder engine and has two cylinders juxtaposed in the leftward and rightward direction in the cylinder block 21. An exhaust pipe 8 is connected to a front wall portion of the cylinder block 21. A battery 32 is disposed in a space surrounded by the cylinder block 21, main frames 12L and 12R, pivot plates 13L and 13R and crankcase 20.

The exhaust pipe 8 includes a pair of left and right forward projections 8L and 8R and a merging portion (not shown). The forward projections 8L and 8R first extend forwardly from the front wall portion of the cylinder block 21, are curved downwardly and then extend downwardly of the crankcase 20. The merging portion is connected to a rear end portion of both of the forward projections 8L and 8R and extends to the outer sides in the vehicle widthwise direction and rearwardly upwardly from below a rear portion of the crankcase 20 until it is connected to a silencer 9.

The left forward projection 8L is connected to a left side one of two exhaust ports not depicted formed in a leftwardly and rightwardly juxtaposed relationship on a front wall portion of the cylinder block 21. The right forward projection 8R is connected to a right side one of the two exhaust ports. The left forward projection 8L passes the left side of the down frame 16 and is curved downwardly while the right forward projection 8R passes the right side of the down frame 16 and is curved downwardly.

The steering system parts supported on the head pipe 11 described above include the front wheel 3, the paired left and right front forks 6L and 6R, a top bridge 7T, a bottom bridge 7B, a steering shaft (not depicted) and the steering handle bar 2. The front wheel 3 is supported by lower portions of the front forks 6L and 6R. The top bridge 7T is provided across upper end portions of the front forks 6L and 6R. The bottom bridge 7B is provided across the front forks 6L and 6R below the top bridge 7T. The steering shaft is provided across the top bridge 7T and the bottom bridge 7B and fitted in and rotatably supported by the head pipe 11. The steering handle bar 2 is disposed at an upper portion side of the steering shaft.

The swing arm 4 is connected to the pivot plates 13L and 13R by a pivot shaft 4A provided substantially at a middle location in the upward and downward direction of the paired left and right pivot plates 13L and 13R of the vehicle body frame 10. The pivot shaft 4A is provided across the paired left and right pivot plates 13L and 13R such that the swing arm 4 is rockable in the upward and downward direction around an axis extending in the leftward and rightward direction.

A cross frame 19 is provided across upper portions of the pivot plates 13L and 13R. Further, a link member 22 is provided across a substantially central portion in the forward and backward direction of a lower portion of the swing arm 4 and lower portions of the pivot plates 13L and 13R. A rear cushion 23 is provided across the link member 22 and the cross frame 19.

A fuel tank 25 is supported on the main frames 12L and 12R, and a driver's seat 26 is supported at front side upper portions of the seat rails 14L and 14R in the rear of the fuel tank 25. A passenger's seat 27 is supported at rear side upper portions of the seat rails 14L and 14R. Seating regions of the driver's seat 26 and the passenger's seat 27 extend along the seat rails 14L and 14R.

The fuel tank 25 extends rearwardly downwardly from a position below the steering handle bar 2 in the rear of the head pipe 11 along and above the main frames 12L and 12R to a position above the pivot plates 13L and 13R. An upper face 25S of the fuel tank 25 is formed in an inclined relationship such that it extends downwardly toward the rear, and extends substantially along the main frames 12L and 12R.

A rear portion of the upper face 25S of the fuel tank 25 is formed at a front portion of the driver's seat 26 and is covered from above with a covering portion 26C extending substantially in parallel to the upper face 25S of the fuel tank 25. The covering portion 26C is formed such that it extends forwardly upwardly from the seating region of the driver's seat 26.

An air cleaner 28 is disposed between the head pipe 11 and the fuel tank 25 above the cylinder block 21 of the engine E. It is to be noted that a rearwardly recessed concave portion is formed at a front portion of the fuel tank 25 and the air cleaner 28 is partly accommodated in the concave portion.

A front cowl 29 is provided around the head pipe 11 such that it extends across the front and the left and right sides (outer sides in the vehicle widthwise direction) of the head pipe 11 and covers the head pipe 11 from the front and the left and right sides.

The front cowl 29 covers a front portion of the fuel tank 25 from the left and right sides and covers the air cleaner 28 from the left and right sides. More particularly, left and right side portions of the front cowl 29 are formed in a downwardly tapering shape. Further, the fuel tank 25 and the air cleaner 28 are covered with upper portions of the downwardly tapering shape, which have a comparatively great dimension in the forward and rearward direction, of the left and right side portions. Lower ends of the left and right side portions of the downwardly tapering shape are positioned in front of a coupling region between the crankcase 20 and the cylinder block 21.

The front cowl 29 is supported by the vehicle body side by being fixed at an inner wall of a front portion thereof to a front cowl stay 30 disposed in front of the head pipe 11. The front cowl stay 30 is formed from a resin material and extends forwardly upwardly from the head pipe 11. A screen 31 is disposed above the front cowl 29 such that it connects smoothly to an outer wall of an upper portion of the front cowl 29. In the present embodiment, the screen 31 is fastened to the front cowl stay 30.

Figure 3:
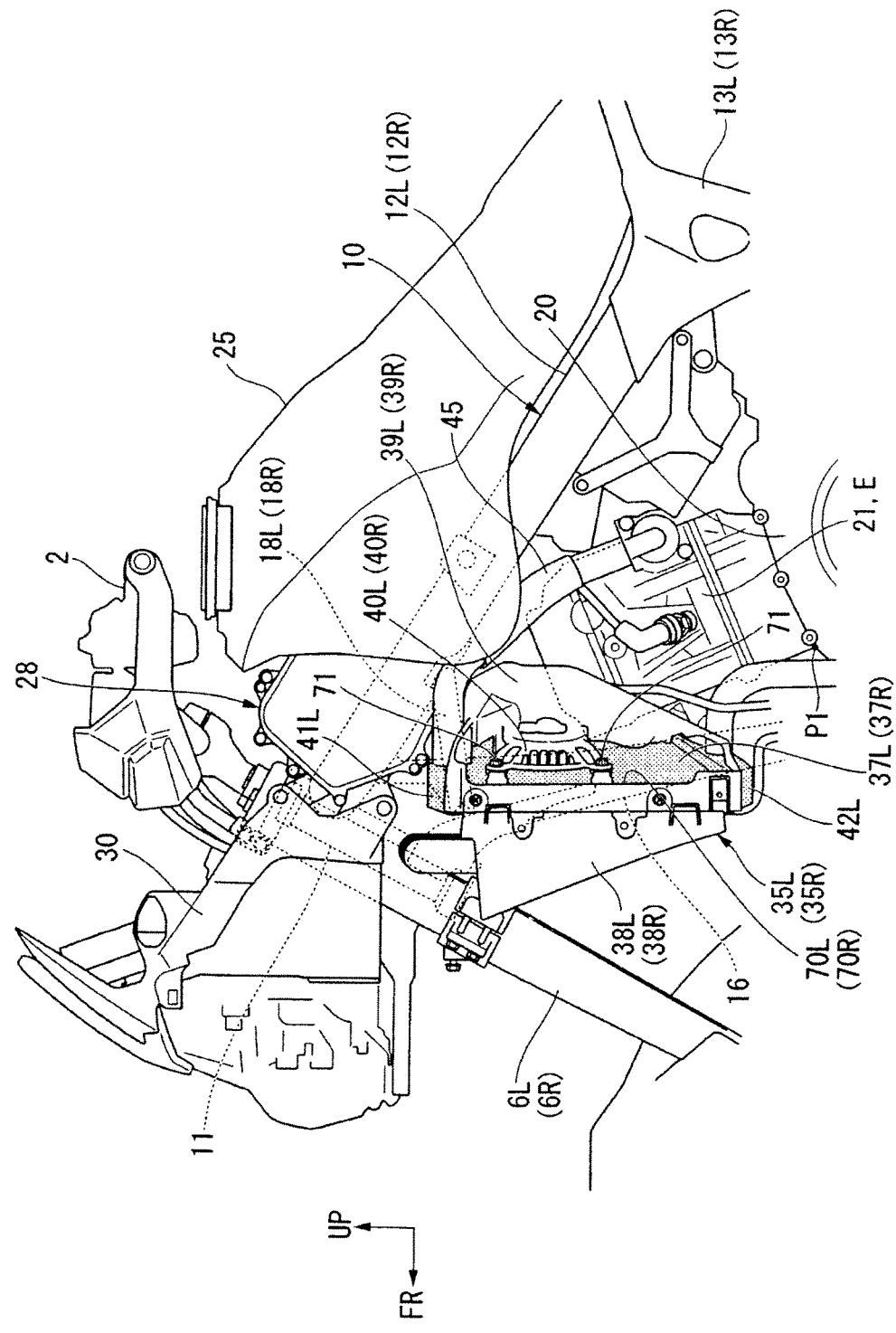
FIG. 3 is a left side elevational view of a front portion of the motorcycle.
Figure 4:
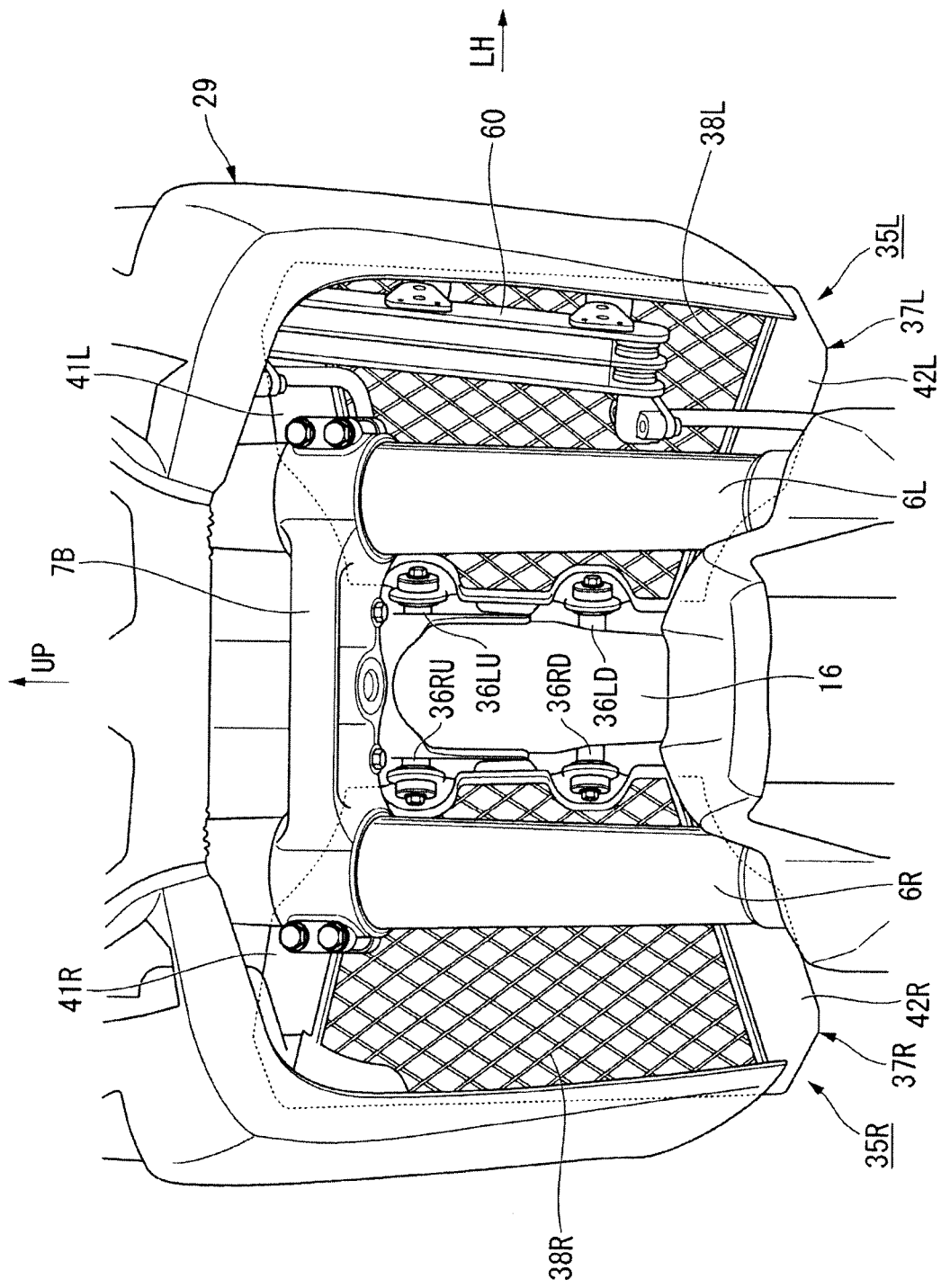
FIG. 4 is a front elevational view of a front portion of the motorcycle.

FIG. 3 depicts a left side elevational view of a front portion of the motorcycle 1 in a state in which the front cowl 29 is removed. FIG. 4 depicts a front elevational view of a front portion of the motorcycle 1. In FIGS. 3 and 4, a pair of left and right radiators 35L and 35R attached to the down frame 16 are depicted. The left radiator 35L is attached to the down frame 16 and disposed on the left of the down frame 16, and the right radiator 35R is attached to the down frame 16 and positioned on the right of the down frame 16.

The left and right radiators 35L and 35R are fastened at side portions thereof on the inner side in the vehicle widthwise direction to attachment portions 36LU, 36LD, 36RU and 36RD provided in upper and lower pairs on the left and the right at a rear portion of the down frame 16 and are supported by the down frame 16. The attachment portions 36LU, 36LD, 36RU and 36RD are tubular members open to the outer sides in the vehicle widthwise direction and have threads formed on an inner circumferential face thereof. It is to be noted that details of an attaching form of the left and right radiators 35L and 35R are hereinafter described.

Further, the left and right radiators 35L and 35R are positioned in the rear of the front forks 6L and 6R and covered with left and right side portions of the front cowl 29.

Figure 5:
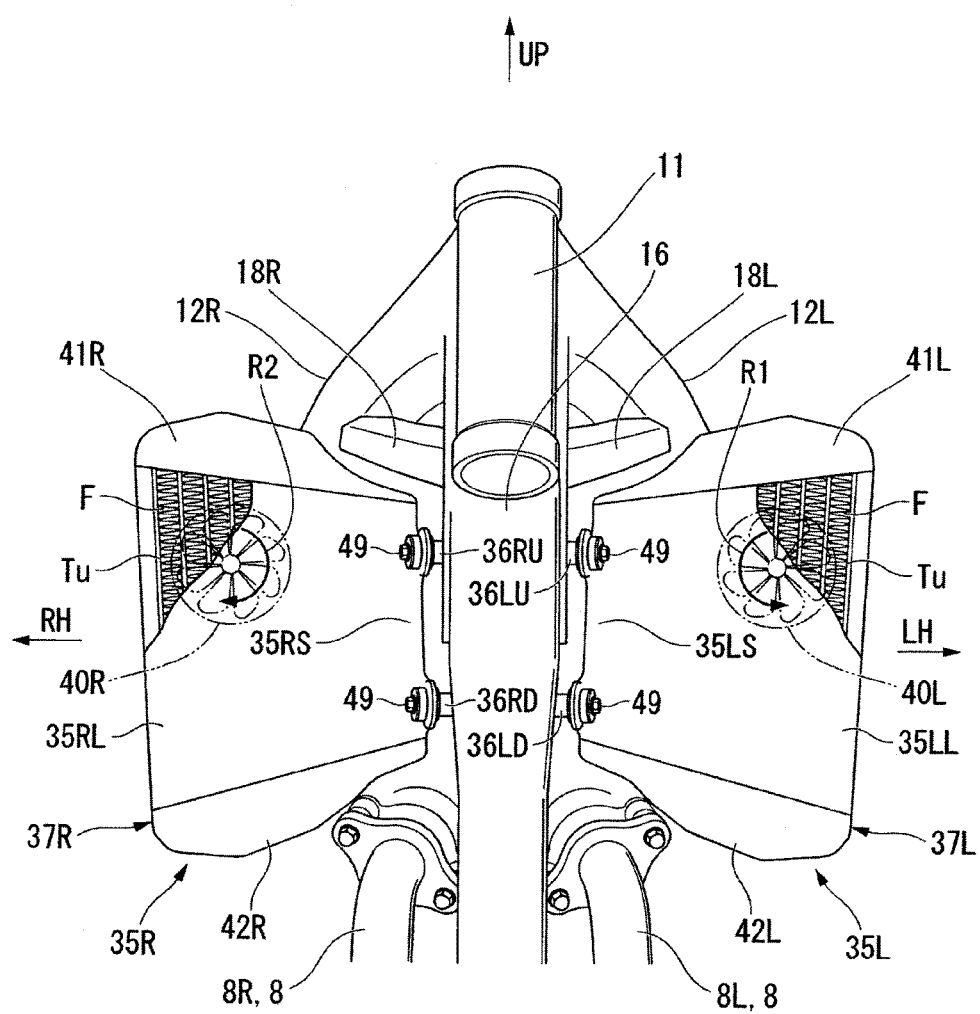
FIG. 5 is a front elevational view of a front portion of the motorcycle in a state in which a front fork and so forth are removed from the motorcycle in the state illustrated in FIG. 4.

FIG. 5 depicts a front elevational view of a front portion of the motorcycle 1 in a state in which the front forks 6L and 6R are removed. In the present embodiment, the left and right radiators 35L and 35R are formed in a trapezoidal shape. Further, each of the left and right radiators 35L and 35R is disposed in such a state that, as viewed in front elevation, a side portion 35LS, 35RS thereof which is a shorter one of two side portions extending in parallel or substantially in parallel to each other is positioned on the inner side in the vehicle widthwise direction and a side portion 35LL, 35RL thereof which is a longer one of the two side portions is positioned at the outer side in the vehicle widthwise direction.

More particularly, referring also to FIGS. 3 to 5, the left radiator 35L includes a radiator main body 37L, a radiator grill 38L, and a radiator shroud 39L, while the right radiator 35R includes a radiator main body 37R, a radiator grill 38R, and a radiator shroud 39R. Each of the radiator main bodies 37L and 37R has a plurality of water pipes Tu and a plurality of fins F. The radiator grills 38L and 38R are disposed in front of the radiator main bodies 37L and 37R while the radiator shrouds 39L and 39R are disposed in the rear of the radiator main bodies 37L and 37R, respectively. The radiator main bodies 37L and 37R and the radiator grills 38L and 38R have a form of a plate. The radiator shrouds 39L and 39R are formed in a shape in which they swell rearwardly from the radiator main bodies 37L and 37R, respectively. It is to be noted that, in FIG. 3, the radiator main body 37L is indicated by dots for the convenience of illustration. Meanwhile, in FIG. 5, only the radiator main bodies 37L and 37R of the left and right radiators 35L and 35R are depicted for the convenience of illustration.

When the left and right radiators 35L and 35R are viewed along a thicknesswise direction of the radiator main bodies 37L and 37R, they are formed in a trapezoidal shape as a whole.

Each of the left and right radiators 35L and 35R is disposed in such a state that, as viewed in front elevation, a side portion 35LS, 35RS from between two side portions thereof which extend in parallel or substantially in parallel to each other from among the four sides forming a trapezoidal shape is positioned on the inner side in the vehicle widthwise direction while a longer side portion 35LL, 35RL is positioned at the outer side in the vehicle widthwise direction. The left and right radiators 35L and 35R are attached at the shorter side portions 35LS and 35RS thereof to and supported by the down frame 16. It is to be noted that, as depicted in FIG. 3, in a state in which the left and right radiators 35L and 35R are attached to the down frame 16, lower ends thereof are positioned higher than a front face upper end P1 of the crankcase 20 of the engine E.

Figure 6:
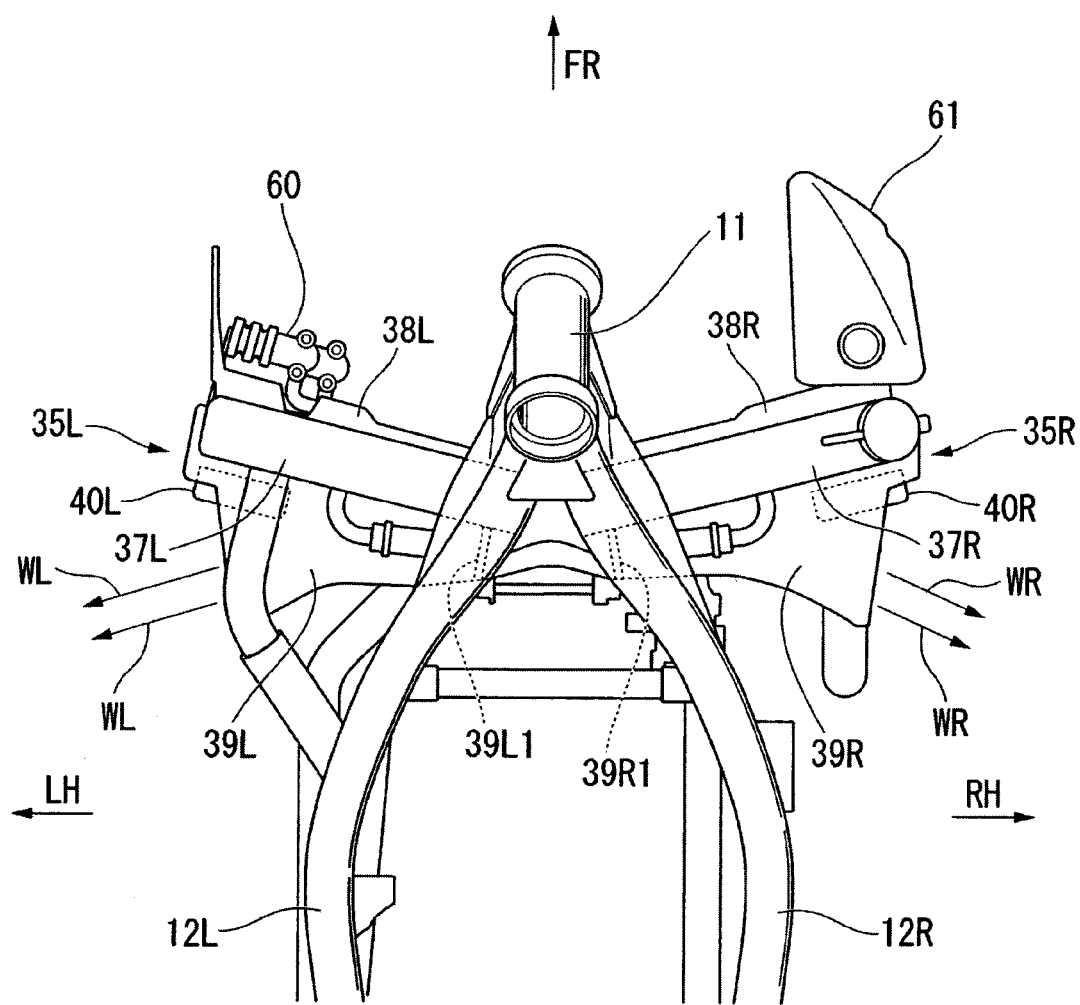
FIG. 6 is a top plan view of the vehicle body frame of the motorcycle in a state in which a radiator is attached to a down frame of the vehicle body frame.

FIG. 6 depicts a top plan view of the left and right radiators 35L and 35R in a state in which they are attached to the down frame 16. As depicted in FIG. 6, the left and right radiators 35L and 35R are disposed in a state in which the radiator main bodies 37L and 37R and the radiator grills 38L and 38R which have a form of a plate are integrated with each other in a state in which they extend along each other. Further, the left and right radiators 35L and 35R extend to the outer sides in the vehicle widthwise direction toward the front.

Further, the radiator shrouds 39L and 39R are integrated with the radiator main bodies 37L and 37R in such a manner as to cover the radiator main bodies 37L and 37R from the rear, respectively. Further, radiator fans 40L and 40R are attached to the outer side portions of the radiator main bodies 37L and 37R in the vehicle widthwise direction, respectively. It is to be noted that the radiator grills 38L and 38R and the radiator shrouds 39L and 39R are formed from a synthetic resin material.

Referring now to FIG. 5, in the motorcycle 1 of the present embodiment, the left forward projection 8L of the exhaust pipe 8 positioned at the same side as that of the left radiator 35L passes below the shorter side portion 35LS at the inner side of the left radiator 35L in the vehicle widthwise direction. Besides, the left reinforcing member 18L positioned at the same side as that of the left radiator 35L passes above the shorter side portion 35LS at the inner side of the left radiator 35L in the vehicle widthwise direction.

Meanwhile, the right forward projection 8R of the exhaust pipe 8 positioned at the same side as that of the right radiator 35R passes below the shorter side portion 35RS at the inner side of the right radiator 35R in the vehicle widthwise direction. Besides, the right reinforcing member 18R positioned at the same side as that of the right radiator 35R passes above the shorter side portion 35RS at the inner side of the right radiator 35R in the vehicle widthwise direction.

Consequently, interference between the left and right radiators 35L and 35R and the left and right forward projections 8L and 8R and reinforcing members 18L and 18R is prevented.

The left and right radiators 35L and 35R are described more particularly. Referring to FIG. 5, in each of the left and right radiator main bodies 37L and 37R of the left and right radiators 35L and 35R, a plurality of water pipes Tu are disposed in a juxtaposed relationship in the vehicle widthwise direction in a state in which they extend in the upward and downward direction. The water pipes Tu are formed longer toward the outer sides in the vehicle widthwise direction.

The left radiator main body 37L includes an upper tank 41L and a lower tank 42L while the right radiator main body 37R includes an upper tank 41R and a lower tank 42R. Each of the upper tanks 41L and 41R has a hose connected thereto for passing cooling water therethrough and is communicated with upper ends of the water pipes Tu. Each of the lower tanks 42L and 42R has a hose connected thereto for passing cooling water therethrough and is communicated with lower ends of the water pipes Tu. The left and right radiator main bodies 37L and 37R feed cooling water entering the upper tanks 41L and 41R into the lower tanks 42L and 42R through the water pipes Tu, respectively.

Further, in the present embodiment, the upper tanks 41L and 41R and the lower tanks 42L and 42R are set such that portions thereof at the outer sides in the vehicle widthwise direction have a greater height in the vertical direction and have a greater capacity than portions thereof at the inner side in the vehicle widthwise direction.

Figure 7:
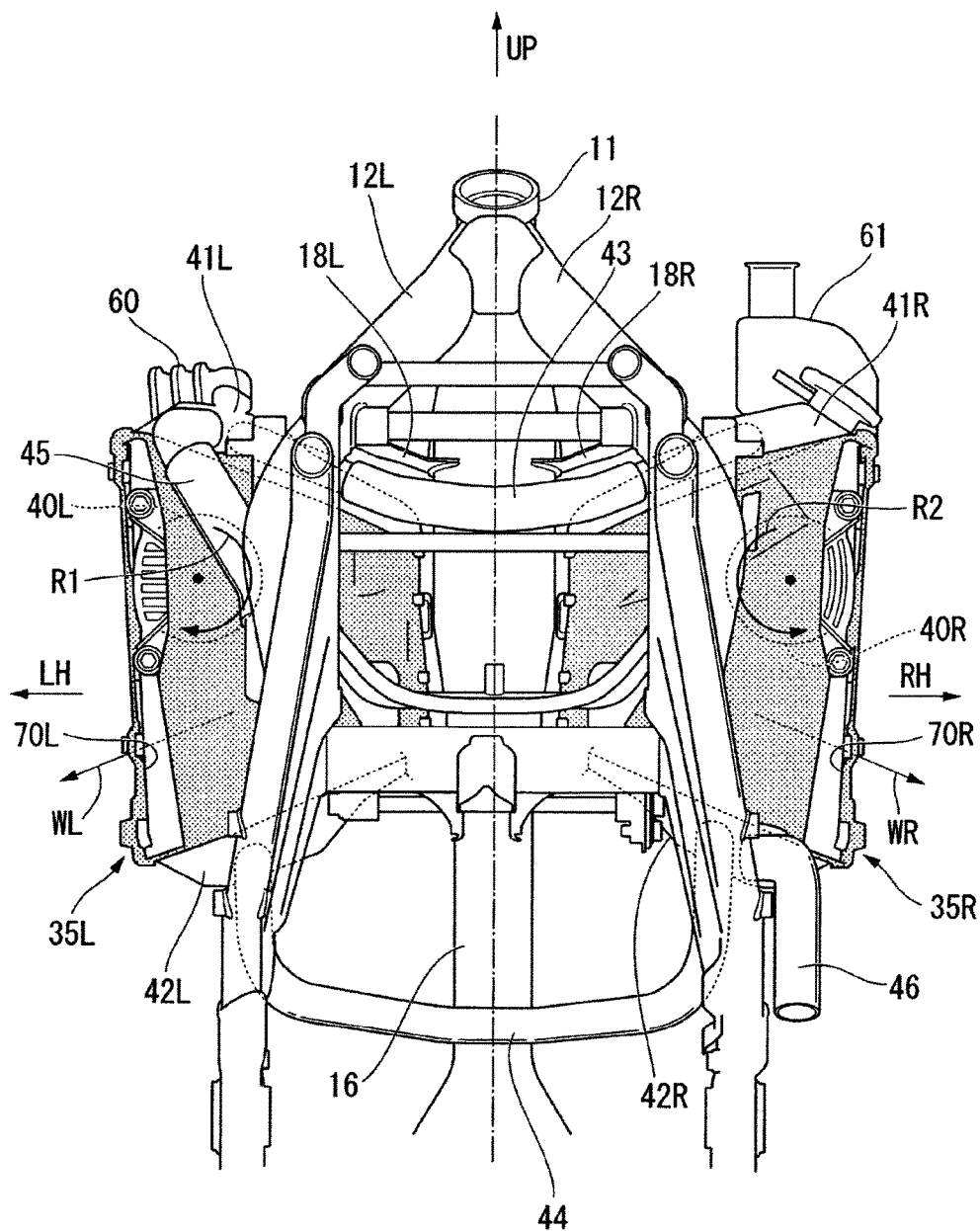
FIG. 7 is a rear elevational view of the vehicle body frame of the motorcycle in a state in which the radiator is attached to the down frame of the vehicle body frame.

A pipe system of the left and right radiators 35L and 35R is described. In certain embodiments, the left and right radiators 35L and 35R are communicated with each other through a pipe system. As depicted in FIG. 7, upper side rear portions of the left and right radiators 35L and 35R, more particularly, rear portions of the upper tanks 41L and 41R, are connected to each other by an upper side radiator connecting hose 43 along which cooling water is circulated. The upper side radiator connecting hose 43 is disposed below the reinforcing members 18L and 18R in the rear of the down frame 16. Meanwhile, lower side rear portions of the left and right radiators 35L and 35R, more particularly, rear portions of the lower tanks 42L and 42R, are connected to each other by a lower side radiator connecting hose 44 along which cooling water is circulated. It is to be noted that, in FIG. 7, the radiator shrouds 39L and 39R are indicated by dots for the convenience of illustration.

In certain embodiments, cooling water before cooling entering the left upper tank 41L is fed into the right upper tank 41R. Referring also to FIG. 3, a radiator feeding hose 45 is connected to a rear portion of the left upper tank 41L and extends forwardly upwardly from a left side portion of the cylinder block 21.

Here, the radiator feeding hose 45 is disposed on the left (outer side in the vehicle widthwise direction) of the reinforcing member 18L in such a state that it overlaps with at least part of the left reinforcing member 18L as viewed in side elevation. Meanwhile, in the present embodiment, cooling water after cooled is fed back to the engine E from the right lower tank 42R, and as depicted in FIG. 7, a radiator discharging hose 46 is connected to a rear portion of the right lower tank 42R.

The connection position of the upper side radiator connecting hose 43 to the left upper tank 41L is set to a position at the outer side in the vehicle widthwise direction of the left upper tank 41L at which the height in the upward and downward direction is greater and the volume is greater than those at a location at the inner side in the vehicle widthwise direction. Further, the connection position is set to the right side with respect to the connection position of the radiator feeding hose 45 to the left upper tank 41L.

The connection position of the upper side radiator connecting hose 43 to the right upper tank 41R is set to a location at the outer side in the vehicle widthwise direction of the right upper tank 41R at which the height in the upward and downward direction is greater and the volume is greater than those at a location at the inner side in the vehicle widthwise direction. Further, the connection position of the radiator feeding hose 45 to the left upper tank 41L is set to a location at the outer side in the vehicle widthwise direction of the upper tank 41L at which the height in the upward and downward direction is greater and the volume is set greater than those at a location at the inner side in the vehicle widthwise direction.

Meanwhile, the connection position of the lower side radiator connecting hose 44 to the right lower tank 42R is set to a location at the outer side in the vehicle widthwise direction of the right lower tank 42R at which the height in the upward and downward direction is greater and the volume is greater than those at a location at the inner side in the vehicle widthwise direction. Further, the connection position is set to the left side with respect to the connection position of the radiator discharging hose 46 to the right lower tank 42R.

The connection position of the radiator discharging hose 46 to the right lower tank 42R is set to a location at the outer side in the vehicle widthwise direction of the right lower tank 42R at which the height in the upward and downward direction is greater and the volume is greater than those at a location at the inner side in the vehicle widthwise direction. Further, the connection position of the lower side radiator connecting hose 44 to the left lower tank 42L is set to a location at the outer side in the vehicle widthwise direction of the left lower tank 42L at which the height in the upward and downward direction is greater and the volume is set greater than those at a location at the inner side in the vehicle widthwise direction.

Now, an attachment mode of the left and right radiators 35L and 35R to the down frame 16, and an attachment mode between the radiator main bodies 37L and 37R, and the radiator grills 38L and 38R and radiator shrouds 39L and 39R are described.

Figure 8:
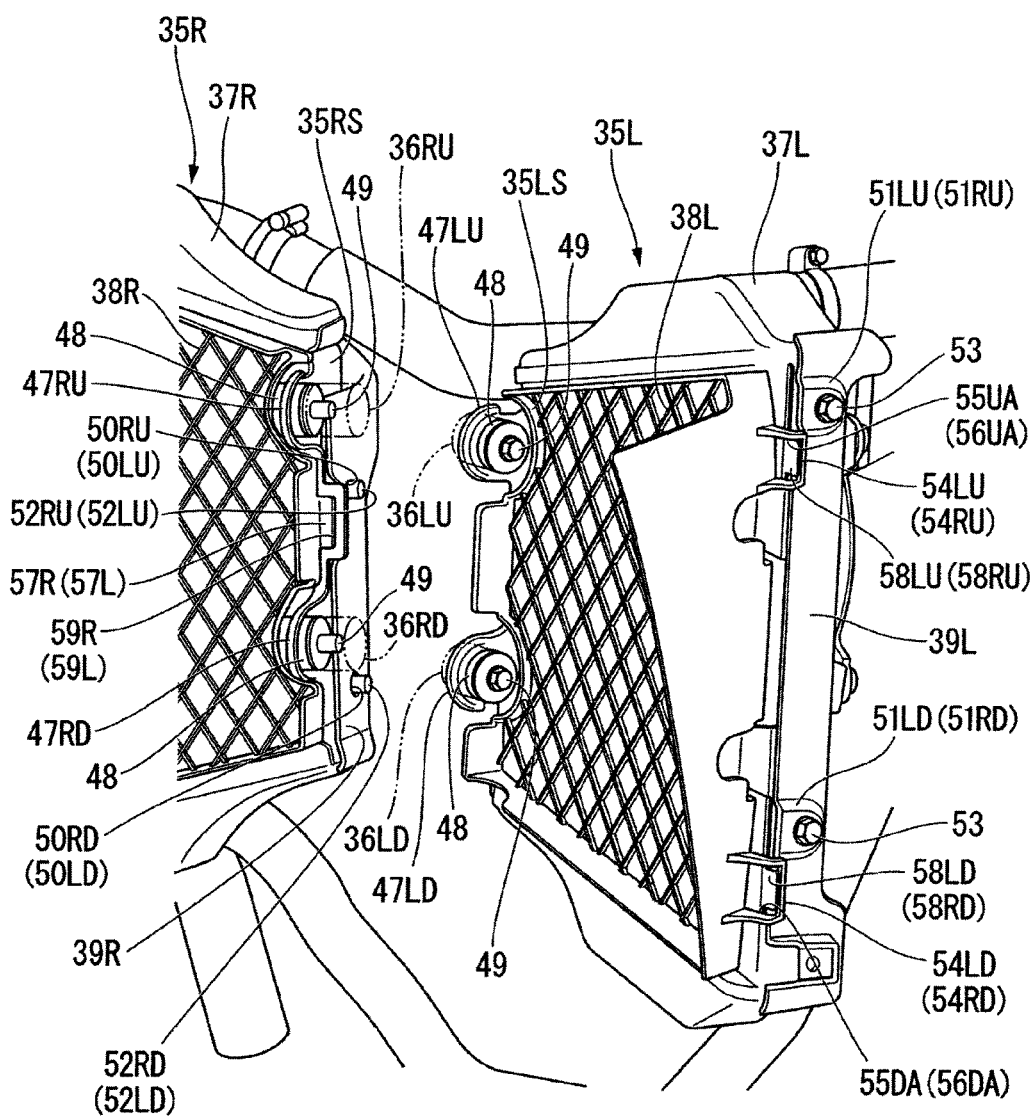
FIG. 8 is a view illustrating an attached state of the radiator, and a radiator shroud and a radiator grill of the radiator.

First, an attachment mode of the left and right radiators 35L and 35R to the down frame 16 is described with reference to FIG. 8. On the shorter side portion 35LS of the left radiator 35L (radiator main body 37L) at the inner side in the vehicle widthwise direction, C-shaped bolt fitting portions 47LU and 47LD are formed in an upper and lower pair such that they project forwardly. Meanwhile, on the shorter side portion 35RS of the right radiator 35R (radiator main body 37R) at the inner side in the vehicle widthwise direction, C-shaped bolt fitting portions 47RU and 47RD are formed in an upper and lower pair such that they project forwardly.

An annular grommet 48 made of an elastic material such as a synthetic resin is inserted in each of the bolt fitting portions 47LU, 47LD, 47RU and 47RD, and a bolt 49 is fitted in each of the totaling four grommets 48 in the left, right, up and down. The four bolts 49 are fastened to the attachment portions 36LU, 36LD, 36RU and 36RD in a state in which they press the grommets 48 by their head portions from the outer sides in the vehicle widthwise direction to attach the left and right radiators 35L and 35R to the down frame 16. It is to be noted that, in FIG. 8, the attachment portions 36LU, 36LD, 36RU and 36RD are indicated by an alternate long and two short dashes line for the convenience of illustration.

Here, the left and right radiators 35L and 35R are supported in floating state on the down frame 16 via elastic materials. Therefore, the vibration is hardly transmitted from the vehicle body frame 10 to the left and right radiators 35L and 35R.

Now, an attachment mode of the radiator main bodies 37L and 37R and the left and right radiator shrouds 39L and 39R is described. As depicted in FIG. 8, the side portion of the right radiator shroud 39R at the inner side in the vehicle widthwise direction extends forwardly in such a manner as to sidewardly go round the side portion at the inner side of the radiator main body 37R in the vehicle widthwise direction. A pair of upper and lower first openings 50RU and 50RD are formed on the side portion.

Further, though not depicted in the drawings for the convenience of illustration, on the side portion also of the left radiator shroud 39L at the inner side in the vehicle widthwise direction similar to that at the right side, a pair of upper and lower first openings 50LU and 50LD similar to the first openings 50RU and 50RD are formed. The reference characters for the first openings 50LU and 50LD are indicated in parentheses for the convenience of illustration.

On the other hand, the side portion of the left radiator shroud 39L at the outer side in the vehicle widthwise direction extends forwardly in such a manner as to sidewardly go round the side portion at the outer side of the radiator main body 37R in the vehicle widthwise direction. A pair of upper and lower first bolt fitting portions 51LU and 51LD are formed on the side portion. Further, though not depicted in the drawings for the convenience of illustration, on the side portion also of the right radiator shroud 39R at the outer side in the vehicle widthwise direction similar to that at the left side, a pair of upper and lower first bolt fitting portions 51RU and 51RD similar to the first bolt fitting portions 51LU and 51LD are formed. The reference characters for the first bolt fitting portions 51RU and 51RD are indicated in parentheses for the convenience of illustration.

The left and right radiator shrouds 39L and 39R are integrated with the radiator main bodies 37L and 37R in the following manner, respectively. In particular, the first openings 50LU and 50LD and the first openings 50RU and 50RD provided on the side portions of the left and right radiator shrouds 39L and 39R on the inner side in the vehicle widthwise direction are fitted with first projections 52LU and 52LD and first projections 52RU and 52RD, respectively. The first projections 52LU, 52LD and 52RU, 52RD are provided on the side portions of the radiator main bodies 37L and 37R at the inner side in the vehicle widthwise direction, respectively. Further, bolts 53 are inserted into the first bolt insertion portions 51LU and 51LD and the first bolt fitting portions 51RU and 51RD provided on the side portions of the left and right radiator shrouds 39L and 39R at the outer sides in the vehicle widthwise direction. Then, the bolts 53 are fastened to the radiator main bodies 37L and 37R to integrate the radiator shrouds 39L and 39R with the radiator main bodies 37L and 37R, respectively.

It is to be noted that the reference characters for the first projections 52LU and 52LD provided on the left radiator main body 37L are indicated in parentheses for the convenience of illustration.

Now, an attachment mode between the radiator main bodies 37L and 37R and the left and right radiator grills 38L and 38R is described. As depicted in FIG. 8, the left radiator grill 38L has, on the side portion thereof at the outer side in the vehicle widthwise direction, a pair of upper and lower insertion portions 54LU and 54LD which project to the outer side in the vehicle widthwise direction. Second openings 55UA and 55DA are formed on the insertion portions 54LU and 54LD, respectively.

Further, though not depicted in the drawings for the convenience of illustration, the right radiator grill 38R has, on the side portion thereof at the outer side in the vehicle widthwise direction, a pair of upper and lower insertion portions 54RU and 54RD which are similar to the portions 54LU and 54LD and project to the outer side in the vehicle widthwise direction. Second openings 56UA and 56DA are formed on the insertion portions 54RU and 54RD, respectively. The reference characters for the insertion portions 54RU and 54RD and the second openings 56UA and 56DA are indicated in parentheses for the convenience of illustration.

Meanwhile, the right radiator grill 38R has a third projection 57R at a substantially central position in the upward and downward direction of the side portion thereof at the inner side in the vehicle widthwise direction. The third projection 57R extends to the radiator main body 37R side and then extends to the inner side in the vehicle widthwise direction. Further, though not depicted in the drawings for the convenience of illustration, also the left radiator grill 38L has a third projection 57L at a substantially central position in the upward and downward direction of the side portion thereof at the inner side in the vehicle widthwise direction. The third projection 57L first extends to the radiator main body 37L side and then extends to the inner side in the vehicle widthwise direction. The reference character for the third projection 57L is indicated with parentheses for the convenience of illustration.

The left and right radiator grills 38L and 38R are integrated with the radiator main bodies 37L and 37R in the following manner, respectively. In particular, the second openings 55UA and 55DA and the second openings 56UA and 56DA provided on the side portions of the left and right radiator grills 38L and 38R on the outer side in the vehicle widthwise direction are fitted with the second projections 58LU and 58LD and the second projections 58RU and 58RD provided on the side portions of the radiator main bodies 37L and 37R on the outer side in the vehicle widthwise direction, respectively. Further, the third projections 57L and 57R provided on the side portions of the left and right radiator grills 38L and 38R on the inner side in the vehicle widthwise direction are inserted into the third openings 59L and 59R formed on the side portions of the radiator main bodies 37L and 37R on the inner sides in the vehicle widthwise direction to integrate the radiator grills 38L and 38R with the radiator main bodies 37L and 37R, respectively.

It is to be noted that the reference characters for the second projections 58RU and 58RD and the third opening 59L are indicated in parentheses for the convenience of illustration.

Referring to FIGS. 4, 6 and 7, an oil cooler 60 is attached to a front portion of the left radiator 35L at the outer side in the vehicle widthwise direction. A radiator reserve tank 61 is attached to an upper portion of the right radiator 35R at the outer side in the vehicle widthwise direction.

Figure 9:
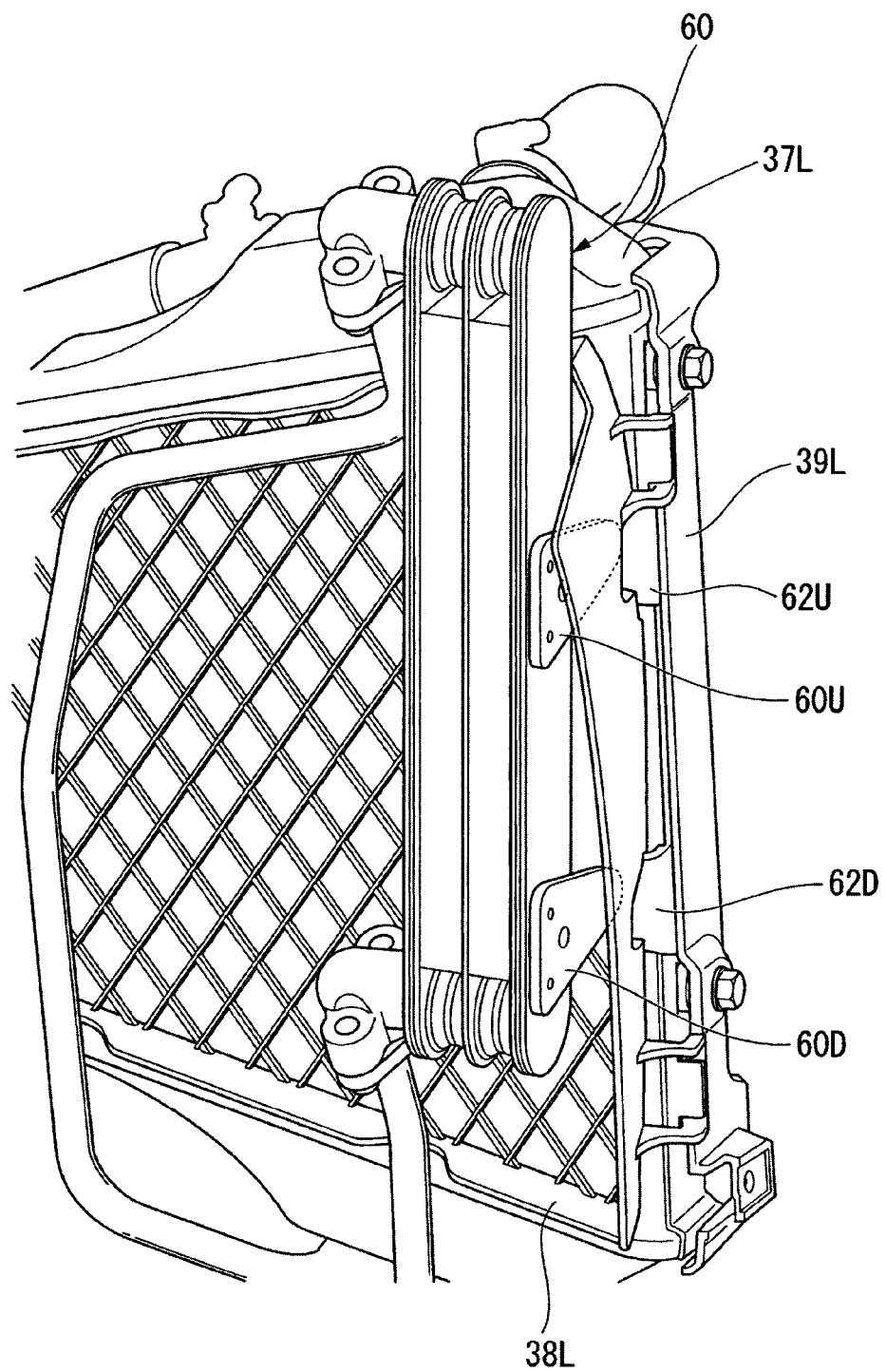
FIG. 9 is a view illustrating an attached mode of an oil cooler attached to the radiator.
Figure 10:
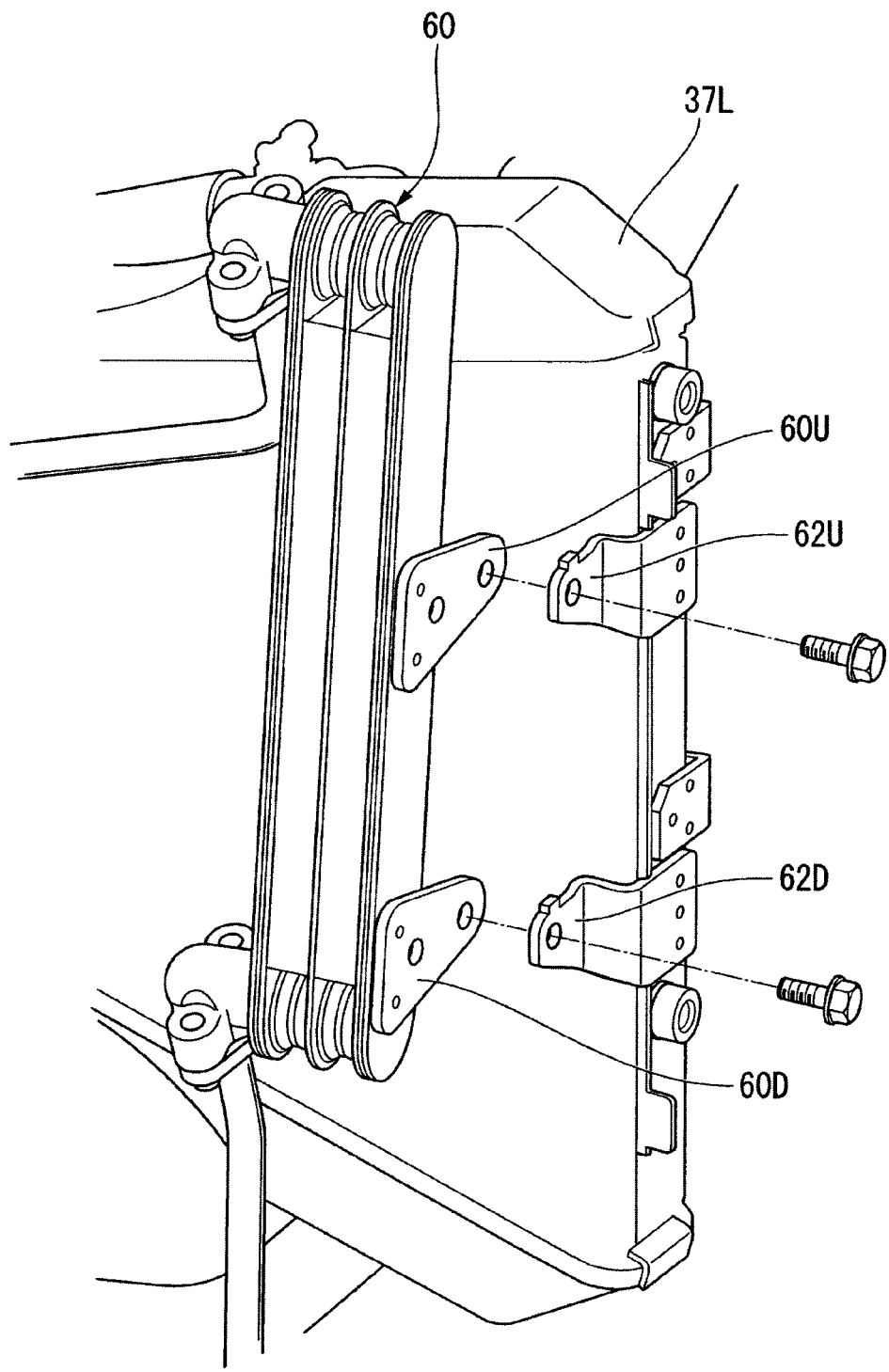
FIG. 10 is a view illustrating the attached mode of the oil cooler attached to the radiator.

As depicted in FIGS. 9 and 10, the oil cooler 60 is formed in a bar-like shape and disposed in a state in which a longitudinal direction thereof coincides with the upward and downward direction. A pair of upper and lower stays 60U and 60D project rearwardly from a left side portion of the oil cooler 60. The stays 60U and 60D are fastened by bolts to a pair of upper and lower stays 62U and 62D provided so as to project forwardly from the side portion of the radiator main body 37L at the outer side in the vehicle widthwise direction to attach the oil cooler 60 to the radiator main body 37L. The oil cooler 60 is positioned in front of the radiator grill 38L in a state in which it is attached to the stays 62U and 62D.

Figure 11:
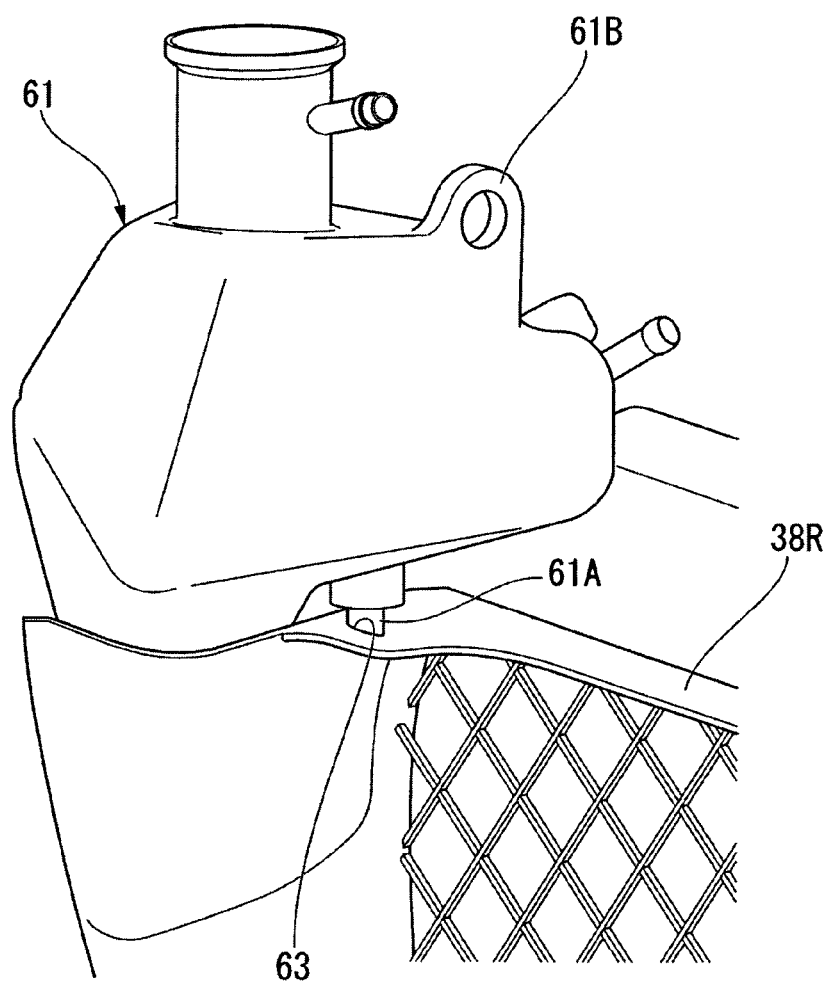
FIG. 11 is a view illustrating the attached mode of a reserve tank attached to the radiator.
Figure 12:
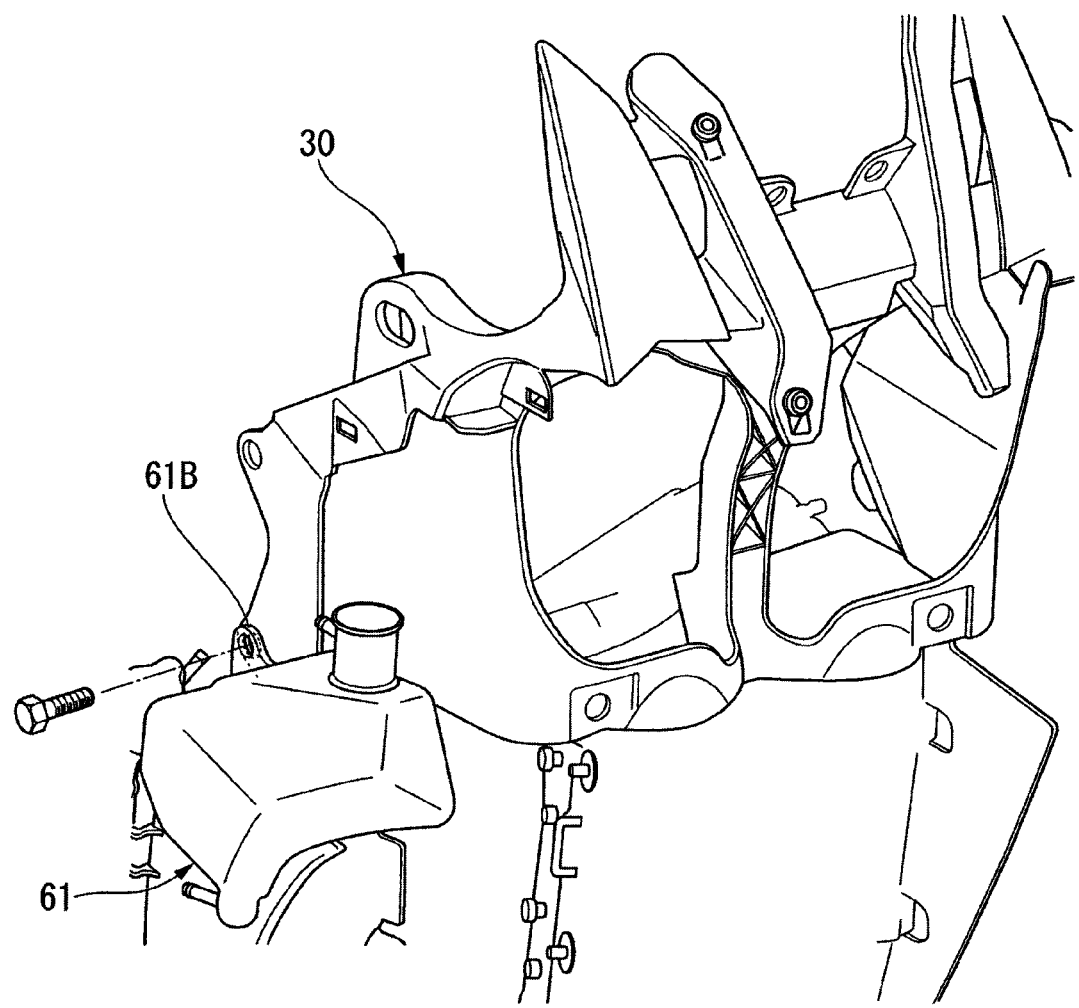
FIG. 12 is a view illustrating the attached mode of the reserve tank attached to the radiator.

FIG. 11 is a view of the right radiator grill 38R as viewed obliquely rearwardly to the outer side in the vehicle widthwise direction. FIG. 12 is a view of the right radiator grill 38R as viewed obliquely rearwardly to the inner side in the vehicle widthwise direction.

As depicted in FIG. 11, the radiator reserve tank 61 has, at a lower portion thereof, a projection 61A which is fitted in an opening 63 provided at an upper portion of the radiator grill 38R and extending in the upward and downward direction through the radiator grill 38R. The radiator reserve tank 61 further has, at an upper portion thereof, a fastening portion 61B fastened to the front cowl stay 30 disposed in front of the head pipe 11.

The radiator reserve tank 61 is supported by the radiator grill 38R and the front cowl stay 30 in such a straddled state that the projection 61A is inserted in the opening 63 as depicted in FIG. 11 and the fastening portion 61B is fastened to the front cowl stay 30 as depicted in FIG. 12.

Incidentally, an attached state of the radiator fans 40L and 40R described above is described in detail. It is described above that the radiator fans 40L and 40R are attached to outer side portions of the radiator main bodies 37L and 37R in the vehicle widthwise direction, respectively. However, in the present embodiment, as shown in FIGS. 3 and 7, openings 70L and 70R are formed at outer side portions in the vehicle widthwise direction of the radiator shrouds 39L and 39R, respectively. The openings 70L and 70R are open to the outer sides in the vehicle widthwise direction and to the rear and extend across an upper end and a lower end of the radiator shrouds 39L and 39R, respectively. Further, the radiator fans 40L and 40R attached to the radiator main bodies 37L and 37R are exposed partly from the radiator main bodies 37L and 37R, respectively.

Meanwhile, the left and right radiator shrouds 39L and 39R cover the radiator fans 40L and 40R, respectively, from the inner side in the vehicle widthwise direction and from above and below. In FIG. 6, reference characters 39L1 and 39R1 denote face portions of the left and right radiator shrouds 39L and 39R on the inner side in the vehicle widthwise direction, respectively. The wall face portions 39L1 and 39R1 cover the radiator fans 40L and 40R from the outer side in the vehicle widthwise direction, respectively. The wall face portions 39L1 and 39R1 have faces extending along the forward and rearward direction substantially along the main frames 12L and 12R below the main frames 12L and 12R, respectively.

The radiator fans 40L and 40R include a bladed wheel and a tubular case surrounding the bladed wheel and are disposed in a state in which the axial line of the bladed wheel is directed substantially orthogonally to the radiator main bodies 37L and 37R. The radiator fans 40L and 40R have three bracket portions projecting from an outer peripheral portion of the tubular case to the outer side in a radial direction. Two of the three bracket portions are extended to an edge portion side of the radiator main bodies 37L and 37R at the outer side in the vehicle widthwise direction through the openings 70L and 70R. A bolt is fitted in each of the two bracket portions from the rear and is fastened to the corresponding edge portion. Further, the remaining bracket portion not depicted in FIGS. 3 and 7 from among the three bracket portions is extended to the inner side in the vehicle widthwise direction and fastened to a suitable location. The radiator fans 40L and 40R are attached thereby to the radiator main bodies 37L and 37R, respectively. The radiator fans 40L and 40R are attached to a rather high position of the radiator main bodies 37L and 37R in the upward and downward direction.

Referring to FIGS. 5 and 7, a rotational arrow mark denoted by reference character R1 indicates a direction of rotation of the bladed wheel of the left radiator fan 40L. Meanwhile, another rotational arrow mark denoted by reference character R2 indicates a direction of rotation of the bladed wheel of the right radiator fan 40R.

Referring to FIG. 7, when the left and right radiators 35L and 35R are viewed toward the advancing direction of the vehicle, the left radiator fan 40L is controlled to rotate in the clockwise direction and the right radiator fan 40R is controlled to rotate in the counterclockwise direction as indicated by the arrow marks R1 and R2, respectively. In other words, as depicted in FIG. 5, when the vehicle is viewed in a front elevational view, the left (left side of the vehicle) radiator fan 40L is controlled to rotate in the counterclockwise direction while the right (right side of the vehicle) radiator fan 40R is controlled to rotate in the clockwise direction.

Consequently, air staying in the radiator shrouds 39L and 39R at an upper portion side at the inner side in the vehicle widthwise direction can be removed efficiently from the lower side of the radiator fans 40L and 40R. Therefore, in the present embodiment, the cooling performance of the radiators 35L and 35R can be improved.

In particular, the radiator fans 40L and 40R are attached to a rather high position in the upward and downward direction. Further, the left and right radiator shrouds 39L and 39R cover the radiator fans 40L and 40R, respectively, from the inner side in the vehicle widthwise direction and from above and below and besides are exposed at the outer sides in the vehicle widthwise direction. Owing to the wall face portions 39L1 and 39R1 on the inner side in the vehicle widthwise direction, air in the radiator shrouds 39L and 39R at the upper portion side of the wall face portions 39L1 and 39R1 is likely to stay and less likely to escape to the outside. Thus, the left and right radiator fans 40L and 40R are rotated with the direction of rotation thereof defined so that air at the upper portion side at the inner side in the vehicle widthwise direction of the left and right radiator shrouds 39L and 39R flows to the lower portion side at the outer sides in the vehicle widthwise direction with a wide space assured therein. Therefore, air staying in the radiator shrouds 39L and 39R is removed efficiently.

In particular, air staying in the radiator shrouds 39L and 39R at the upper portion side at the inner side in the vehicle widthwise direction flows efficiently to the outside as indicated by arrow marks WL and WR in FIGS. 6 and 7. Consequently, the air passing through and heated by the radiator main bodies 37L and 37R is discharged to improve the cooling performance of the radiators 35L and 35R.

In the motorcycle 1 in certain embodiments, the left and right radiators 35L and 35R are formed in a plate-like shape. Further, each of the radiators 35L and 35R is disposed such that the shorter side portion 35LS, 35RS from between two side portions extending in parallel or substantially in parallel to each other as viewed in front elevation is positioned at the inner side in the vehicle widthwise direction. Meanwhile, the longer side portion 35LL, 35RL is positioned at the outer side in the vehicle widthwise direction. Further, the forward projections 8L and 8R of the exhaust pipe 8 pass below the shorter side portions 35LS and 35RS described above and besides the reinforcing members 18L and 18R pass above the side portions 35LS and 35RS described above, respectively.

Consequently, in the motorcycle 1, while interference between the radiators 35L and 35R, and the exhaust pipe 8 and reinforcing members 18L and 18R is prevented, the dimension of the radiators 35L and 35R is assured in the vehicle widthwise direction and the upward and downward direction by the portions of the radiators 35L and 35R whose dimension in the upward and downward direction gradually increases toward the outer sides in the vehicle widthwise direction from the side portions at the inner side in the vehicle widthwise direction. Therefore, the capacity of the radiators 35L and 35R can be assured. Consequently, in the motorcycle 1, even if some member around the radiator 35L or 35R restricts the size of the radiator 35L or 35R, the capacity of the radiators 35L and 35R can be assured suitably thereby to improve the cooling efficiency of the radiators 35L and 35R.

Further, in certain embodiments, the lower end of the left and right radiators 35L and 35R is positioned higher than the upper end of the front face of the crankcase 20 of the engine E.

Consequently, traveling wind passing below the radiators 35L and 35R directly hits the front face of the crankcase 20 so that the cooling efficiency of the engine E can be raised together with improvement of the cooling efficiency of the radiators 35L and 35R.

Further, in certain embodiments, the radiator main body 37L and 37R and the radiator grills 38L and 38R are formed in a plate-like shape, and integrated with each other in a state in which they extend along each other. Further, the radiator main bodies 37L and 37R and the radiator grills 38L and 38R are disposed in a state in which they extend to the outer sides in the vehicle widthwise direction as they extend forwardly as viewed in top plan.

Consequently, the locus of rotation of a steering system (front forks 6L and 6R) rotatably supported on the head pipe 11 can be positioned in the space between the left and right radiators 35L and 35R thereby to dispose the radiators 35L and 35R in a forwardly packed state. Consequently, the space can be utilized effectively thereby to achieve compactification of the vehicle and improvement in degree of freedom of the layout of other parts.

Further, in certain embodiments, the radiator main bodies 37L and 37R are configured such that the water pipes Tu are disposed in a juxtaposed relationship in the vehicle widthwise direction in a state in which they extend in the upward and downward direction, and the water pipes Tu are formed longer toward the outer sides in the vehicle widthwise direction. Further, each of the radiator main bodies 37L and 37R includes the upper tank 41L, 41R to which the hose for passing cooling water therethrough is connected and which is communicated with upper ends of the water pipes Tu and the lower tank 42L, 42R to which the hose for passing cooling water therethrough is connected and which is communicated with lower ends of the water pipes Tu. The cooling water which enters the upper tanks 41L and 41R enters the lower tanks 42L and 42R through the water pipes Tu. Further, the upper tanks 41L and 41R and the lower tanks 42L and 42R are configured such that the height thereof in the upward and downward direction and the capacity of a portion thereof at the outer side in the vehicle widthwise direction are set higher and greater than those of a portion thereof at the inner side in the vehicle widthwise direction.

Consequently, a large difference in the heightwise direction can be assured between the side portion at the inner side in the vehicle widthwise direction (shorter side portion) and the side portion at the outer side in the vehicle widthwise direction (longer side portion) of the radiators 35L and 35R. Consequently, a sufficient capacity of the radiators 35L and 35R can be assured readily in a high space efficiency while avoiding interference between the radiators 35L and 35R, and the exhaust pipe 8 and reinforcing members 18L and 18R.

Further, a large capacity is assured for a region of the upper tanks 41L and 41R at the outer side in the vehicle widthwise direction, and from the upper tanks 41L and 41R, much cooling water can be supplied to the water pipe, which exhibits a high cooling efficiency, formed long and rather near to the outer side of the water pipes Tu in the vehicle widthwise direction. Therefore, the cooling efficiency can be improved. Furthermore, the upper tanks 41L and 41R and the lower tanks 42L and 42R are inclined downwardly and can supply cooling water smoothly to the lower side of the inside thereof, and consequently, also the circulation efficiency of cooling water can be improved.

Further, in certain embodiments, each of the radiator shrouds 39L and 39R has the first opening 50LU, 50LD, 50RU, 50RD provided at the inner side thereof in the vehicle widthwise direction and is integrated with the radiator main body 37L, 37R by fitting the first opening 50LU, 50LD, 50RU, 50RD with the first projection 52LU, 52LD, 52RU, 52RD provided at the inner side in the vehicle widthwise direction of the radiator main body 37L, 37R and fitting the bolt 53 to the outer side in the vehicle widthwise direction of the radiator shroud 39L, 39R to fasten the radiator shroud 39L, 39R to the radiator main body 37L, 37R.

Consequently, the radiator shrouds 39L and 39R can be integrated readily with the radiator main bodies 37L and 37R, respectively.

Further, in certain embodiments, each of the radiator grills 38L and 38R has the second opening 55UA, 55DA, 56UA, 56DA provided at the outer side thereof in the vehicle widthwise direction and the third projection 57L, 57R provided at the outer side thereof in the vehicle widthwise direction, and is integrated with the radiator main body 37L, 37R by inserting the second projection 58LU, 58LD, 58RU, 58RD provided at the side portion of the radiator main body 37L, 37R at the outer side in the vehicle widthwise direction into the second opening 55UA, 55DA, 56UA, 56DA and inserting the third projection 57L, 57R into the third opening 59L, 59R formed on the radiator main body 37L, 37R.

Consequently, the radiator grill can be integrated readily with the radiator main body.

In certain embodiments, in each of the radiator main bodies 37L and 37R, the first projection 52LU, 52LD, 52RU, 52RD is provided at the inner side in the vehicle widthwise direction and the second projection 58LU, 58LD, 58RU, 58RD is provided at the outer side in the vehicle widthwise direction. Further, the first opening 50LU, 50LD, 50RU, 50RD of the radiator shroud 39L, 39R is provided at the inner side in the vehicle widthwise direction, and the second openings 55UA and 55DA and the second openings 56UA are 56DA are spaced to the inner side and the outer side in the vehicle widthwise direction and are fitted with the corresponding projections.

By selectively distributing the insertion points of the radiator shrouds 39L and 39R and the radiator grills 38L and 38R into the radiator main bodies 37L and 37R to the inner side and the outer sides in the vehicle widthwise direction in this manner, erroneous assembly can be prevented. Further, the radiator main bodies 37L and 37R can be prevented from increasing in size uselessly.

Further, in certain embodiments, the oil cooler can be attached to the left radiator 35L and the radiator reserve tank 61 is attached to the right radiator 35R.

Consequently, by selectively disposing the oil cooler 60 and the radiator reserve tank 61 to the left and right, the balance (mass balance) in the leftward and rightward direction can be uniformized.

Further, in certain embodiments, the radiator reserve tank 61 is supported on the radiator grill 38R and the front cowl stay 30 by inserting the projection 61A of the radiator reserve tank 61 into the opening 63 formed in the radiator grill 38R and fastening the fastening portion 61B to the front cowl stay 30.

Consequently, since the radiator grill 38R, the radiator reserve tank 61 and the front cowl stay 30 are connected to each other, the rigidity of the members can be assured. Further, since liquid in the radiator reserve tank 61 provides a vibration suppression effect, vibration generated on the radiator grill 38R and the front cowl stay 30 can be suppressed.

While embodiments of the present invention have been described above, the present invention is not limited to the embodiment described above but can be modified in various manners without departing from the scope of the present invention.

For example, while, in the embodiments described hereinabove, both of the left and right radiators 35L and 35R are formed in a trapezoidal shape, only one of them may be formed in a trapezoidal shape.

Further, while, in the embodiments described above, the present invention is applied to a motorcycle as a saddle type vehicle, the saddle type vehicle in the present invention is a concept including general vehicles on which a driver rides across a vehicle body and includes not only motorcycles but also three-wheeled and four-wheeled vehicles. Therefore, the present invention can be applied not only to motorcycles but also to three-wheeled and four-wheeled vehicles.

DESCRIPTION OF REFERENCE SYMBOLS

1 Motorcycle (saddle type vehicle)
8 Exhaust pipe
8L, 8R Forward projection
10 Vehicle body frame
11 Head pipe
12L, 12R Main frame
16 Down frame
18L, 18R Reinforcing member
20 Crankcase
30 Front cowl stay
35L, 35R Radiator
35LS, 35RS Short side portion
35LL, 35RL Long side portion
37L, 37R Radiator main body
38L, 38R Radiator grill
39L, 39R Radiator shroud
40L, 40R Radiator fan
41L, 41R Upper tank
42L, 42R Lower tank
43 Upper side radiator connecting hose
45 Radiator feeding hose
50LU, 50LD, 50RU, 50RD First opening
52LU, 52LD, 52RU, 52RD First projection
53 Bolt (fastening member)
55UA, 55DA, 56UA, 56DA Second opening
57L, 57R Third projection
58LU, 58LD, 58RU, 58RD Second projection
59L, 59R Third opening
60 Oil cooler
61 Radiator reserve tank
61A Projection
61B Fastening portion
63 Opening
E Engine
Tu Water pipe
F Fin

The invention claimed is:

1. A saddle type vehicle, comprising:
left and right main frames extending rearwardly from a head pipe;
a down frame extending downwardly from the head pipe;
an engine disposed below the left and right main frames in a rear of the down frame, and a pair of left and right radiators attached to the down frame; and
an exhaust pipe connected to the engine includes left and right forward projections extending forwardly from the engine, passing a left and right of the down frame and being curved downwardly, wherein
at least one of the left and right radiators is formed in a trapezoidal shape, and the one of the radiators which is formed in the trapezoidal shape is disposed in a state in which, as viewed in front elevation, a shorter one of two side portions extending in parallel or substantially in parallel to each other is positioned at an inner side in a vehicle widthwise direction, and a longer one of the side portions is disposed at an outer side in the vehicle widthwise direction, and wherein
the forward projection positioned at a same side as the radiator formed in the trapezoidal shape is placed in a state in which the forward projection passes below the shorter side portion at the inner side in the vehicle widthwise direction of the radiator formed in the trapezoidal shape.

2. The saddle type vehicle according to claim 1, wherein the lower ends of the radiators are positioned higher than a front face upper end of a crankcase of the engine.

3. The saddle type vehicle according to claim 1, wherein the left and right radiators are formed in a trapezoidal shape, each of the left and right radiators includes radiator main body having a plurality of water pipes and a plurality of fins and a radiator grill disposed in front of the radiator main body, and wherein the radiator main bodies and the radiator grills are formed in a plate-like shape and integrated in a state in which the radiator main bodies and the radiator grills extend along each other, and the radiator main bodies and the radiator grills are disposed in a state in which the radiator main bodies and the radiator grills extend to the outer sides in the vehicle widthwise direction as the radiator main bodies and the radiator grills (38L and 38R) extend forwardly as viewed in top plan.

4. The saddle type vehicle according to claim 3, wherein the radiator main bodies are configured such that the water pipes are disposed in a juxtaposed relationship in the vehicle widthwise direction in a state in which the water pipes extend in an upward and downward direction, and the water pipes are formed longer toward the outer sides in the vehicle widthwise direction, each of the radiator main bodies includes an upper tank to which a hose for passing cooling water therethrough is connected and which is communicated with upper ends of the water pipes and a lower tank to which a hose for passing cooling water therethrough is connected and which is communicated with lower ends of the water pipes, the cooling water which enters the upper tanks entering the lower tanks through the water pipes, and wherein the upper tanks and the lower tanks are configured such that the height thereof in the upward and downward direction and the capacity of a portion thereof at the outer side in the vehicle widthwise direction are set higher and greater than those of a portion thereof at the inner side in the vehicle widthwise direction.

5. The saddle type vehicle according to claim 3, wherein each of the left and right radiators includes a radiator shroud disposed in the rear of the radiator main body, and wherein the radiator shroud has a first opening provided at one end portion thereof and is integrated with the radiator main body by fitting the first opening with a first projection provided on the radiator main body and fitting a first fastening member to the other end portion of the radiator shroud at the opposite side to the one end portion to fasten the radiator shroud to the radiator main body.

6. The saddle type vehicle according to claim 3, wherein each of the radiator grills has a second opening provided at one end portion thereof and a third projection provided at the other end portion thereof at the opposite side of the one end portion, and is integrated with the radiator main body by inserting a second projection provided on the radiator main body into the second opening and inserting the third projection into a third opening formed on the radiator main body.

7. The saddle type vehicle according to claim 5, wherein each of the radiator grills has a second opening provided at one end portion thereof and a third projection provided at the other end portion thereof at the opposite side to the one end portion, and is integrated with the radiator main body by inserting a second projection provided on the radiator main body into the second opening and inserting the third projection into a third opening formed on the radiator main body, one of the first projection and the second projection provided on the radiator main body is provided at the inner side in the vehicle widthwise direction and the other one of the first and second projections is provided at the outer side in the vehicle widthwise direction, and wherein the first opening provided at the one end portion of the radiator shroud and the second opening provided at the one end portion of the radiator grill are spaced to the inner side and the outer side in the vehicle widthwise direction.

8. The saddle type vehicle according to claim 3, wherein an oil cooler is attached to one of the left and right radiators and a radiator reserve tank is attached to the other one of the left and right radiators.

9. The saddle type vehicle according to claim 8, wherein the radiator reserve tank has a projection inserted in an opening provided at an upper portion of the radiator grill and a fastening portion fastened to a front cowl stay disposed in front of the head pipe, and is supported on the radiator grill and the front cowl stay by inserting the projection into the opening and fastening the fastening portion to the front cowl stay.

10. The saddle type vehicle according to claim 1, wherein a pair of left and right reinforcing members are provided across the left and right main frames and the down frame, and wherein the reinforcing member positioned at the same side as the radiator formed in the trapezoidal shape is in a state in which the reinforcing member passes above the shorter side portion at the inner side in the vehicle widthwise direction of the radiator formed in the trapezoidal shape.

11. The saddle type vehicle according to claim 10, wherein upper portions of the left and right radiators are connected to each other by a radiator connection hose through which cooling water is circulated, and wherein the radiator connection hose is disposed in the rear of the down frame below the reinforcing members.

12. The saddle type vehicle according to claim 10, wherein a radiator feeding hose for feeding cooling water from the engine therethrough is connected to an upper portion of one of the left and right radiators, and wherein the radiator feeding hose is disposed in a state in which the radiator feeding hose overlaps with at least part of the reinforcing members as viewed in side elevation.

13. The saddle type vehicle according to claim 1, wherein each of the left and right radiators includes a radiator main body having a plurality of water pipes and a plurality of fins and a radiator shroud disposed in the rear of the radiator main body, a radiator fan is attached to each of the left and right radiator main bodies, the radiator fans are attached to a higher position in the upward and downward direction, each of the left and right radiator shrouds covers the radiator fans from the inner side in the vehicle widthwise direction and from above and below but exposes the radiator fans from the outer side in the vehicle widthwise direction, and the left radiator fan is controlled so as to rotate in a clockwise direction but the right radiator fan is controlled so as to rotate in a counterclockwise direction.

14. A saddle type vehicle, comprising:

means for supporting vehicle components extending rearwardly from means for supporting steering components; and means for extending downwardly extending downwardly from the means for supporting steering components, said means for extending downwardly also for supporting vehicle components thereupon;

means for providing motive power being disposed below the means for supporting vehicle components and in a rear of the means for extending downwardly, and means for providing a radiator attached to the means for extending downwardly; and means for carrying exhaust gas being connected to the means for providing motive power and including left and right forward projections extending forwardly from the means for providing motive power, passing a left and right of the means for extending downwardly and being curved downwardly, wherein the means for providing a radiator comprises left and right radiators, wherein at least one of the left and right radiators is formed in a trapezoidal shape, the at least one of the radiators being disposed in a state in which, as viewed in front elevation, a shorter one of the two portions extending in parallel or substantially in parallel to each other is positioned at an inner side in a vehicle widthwise direction, and a longer one of the side portions is disposed at an outer side in the vehicle widthwise direction, and wherein the forward projection positioned at a same side as the at least one radiator is placed in a state in which the forward projection passes below the shorter side portion at the inner side in the vehicle widthwise direction of the at least one radiator.

15. The saddle type vehicle according to claim 14, wherein a lower end of the means for providing a radiator is positioned higher than a front face upper end of a crank case of the engine.

16. The saddle type vehicle according to claim 14, wherein the means for providing a radiator are formed in a trapezoidal shape, each of the left and right radiators of the means for providing a radiator includes a means for supporting a plurality of water pipes, a plurality of fins, and a radiator grill thereon, said radiator grill being disposed in front of the means for supporting a plurality of water pipes, a plurality of fins, and a radiator grill, and wherein the means for supporting a plurality of water pipes, a plurality of fins, and a radiator grill and the radiator grills are formed in a plate-like shape and are integrated in a state in which the means for supporting a plurality of water pipes, a plurality of fins, and a radiator grill and the radiator grills extend along each other, and the means for supporting a plurality of water pipes, a plurality of fins, and a radiator grill and the radiator grills are disposed in a state in which the means for supporting a plurality of water pipes, a plurality of fins, and a radiator grill and the radiator grills extend to outer sides in the vehicle widthwise direction as the means for supporting a plurality of water pipes, a plurality of fins, and a radiator grill and the radiator grills extend forwardly as viewed in top plan.

17. The saddle type vehicle according to claim 16, wherein the means for supporting a plurality of water pipes, a plurality of fins, and a radiator grill are configured such that the water pipes are disposed in a juxtaposed relationship in the vehicle widthwise direction in a state in which the water pipes extend in an upward and downward direction, and the water pipes are formed longer toward the outer sides in the vehicle widthwise direction, wherein each of the means for supporting a plurality of water pipes, a plurality of fins, and a radiator grill includes an upper tank to which a hose for passing cooling water therethrough is connected and which is communicated with upper ends of the water pipes and a lower tank to which a hose for passing cooling water therethrough is connected and which is communicated with lower ends of the water pipes, the cooling water which enters the upper tanks entering the lower tanks through the water pipes, and wherein the upper tanks and the lower tanks are configured such that the height thereof in the upward and downward direction and the capacity of a portion thereof at the outer side in the vehicle widthwise direction are set higher and greater than those of a portion thereof at the inner side in the vehicle widthwise direction.

18. The saddle type vehicle according to claim 16, wherein each of the left and right radiators of the means for providing a radiator includes a means for shrouding a radiator disposed in the rear of the means for supporting a plurality of water pipes, a plurality of fins, and a radiator grill, and wherein each radiator shroud has a first opening provided at one end portion thereof and is integrated with the means for supporting a plurality of water pipes, a plurality of fins, and a radiator grill by fitting the first opening with a first projection provided on the means for supporting a plurality of water pipes, a plurality of fins, and a radiator grill and fitting a first means for fastening to the other end portion of the radiator shroud at the opposite side to the one end portion to fasten the radiator shroud to the means for supporting a plurality of water pipes, a plurality of fins, and a radiator grill.

19. The saddle type vehicle according to claim 16, wherein each of the radiator grills has a second opening provided at one end portion thereof and a third projection provided at the other end portion thereof at the opposite side of the one end portion, and is integrated with the means for supporting a plurality of water pipes, a plurality of fins, and a radiator grill by inserting a second projection provided on the means for supporting a plurality of water pipes, a plurality of fins, and a radiator grill into the second opening and inserting the third projection into a third opening formed on the means for supporting a plurality of water pipes, a plurality of fins, and a radiator grill.

* * * * *